US010873930B2

(12) United States Patent
Stanwood et al.

(10) Patent No.: US 10,873,930 B2
(45) Date of Patent: Dec. 22, 2020

(54) FRAMING FOR AN ADAPTIVE MODULATION COMMUNICATION SYSTEM

(71) Applicant: Wi-LAN Inc., Ottawa (CA)

(72) Inventors: Kenneth L. Stanwood, Cardiff by the Sea, CA (US); Israel Jay Klein, San Diego, CA (US); George Lin, Del Mar, CA (US); An Chen, San Diego, CA (US)

(73) Assignee: Wi-LAN Inc., Ottawa (CA)

( * ) Notice: Subject to any disclaimer, the term of this patent is extended or adjusted under 35 U.S.C. 154(b) by 162 days.

(21) Appl. No.: 15/644,320

(22) Filed: Jul. 7, 2017

(65) Prior Publication Data

US 2017/0311300 A1 Oct. 26, 2017

Related U.S. Application Data

(60) Continuation of application No. 14/835,471, filed on Aug. 25, 2015, now Pat. No. 10,117,234, which is a
(Continued)

(51) Int. Cl.
*H04W 72/04* (2009.01)
*H04B 7/26* (2006.01)
(Continued)

(52) U.S. Cl.
CPC ...... *H04W 72/042* (2013.01); *H04B 7/15557* (2013.01); *H04B 7/212* (2013.01);
(Continued)

(58) Field of Classification Search
CPC ............... H04W 72/042; H04W 72/14; H04W 56/0085; H04B 7/15557; H04B 7/212;
(Continued)

(56) References Cited

U.S. PATENT DOCUMENTS

| 3,949,404 A | 4/1976 | Fletcher et al. |
| 4,495,619 A | 1/1985 | Acampora et al. |

(Continued)

FOREIGN PATENT DOCUMENTS

| CA | 2309472 A1 | 11/2001 |
| EP | 483546 B1 | 5/1997 |

(Continued)

OTHER PUBLICATIONS

Nikos Passos et al, "MAC Protocol and Traffic Scheduling for Wireless ATM Networks", 1998, pp. 1-8, Can also be found and cited in app No. 13901185 (belonging to the same applicant) (Year: 1998).*

(Continued)

*Primary Examiner* — Christopher P Grey
(74) *Attorney, Agent, or Firm* — Procopio, Cory, Hargreaves & Savitch LLP

(57) ABSTRACT

A system and method for mapping a combined frequency division duplexing (FDD) Time Division Multiplexing (TDM)/Time Division Multiple Access (TDMA) downlink subframe for use with half-duplex and full-duplex terminals in a communication system. Embodiments of the downlink subframe vary Forward Error Correction (FEC) types for a given modulation scheme as well as support the implementation of a smart antenna at a base station in the communication system. Embodiments of the system are also used in a TDD communication system to support the implementation of smart antennae. A scheduling algorithm allows TDM and TDMA portions of a downlink to efficiently co-exist in the same downlink subframe and simultaneously support full and half-duplex terminals.

10 Claims, 17 Drawing Sheets

Related U.S. Application Data continuation of application No. 13/903,712, filed on May 28, 2013, now Pat. No. 9,191,940, which is a continuation of application No. 13/427,692, filed on Mar. 22, 2012, now Pat. No. 8,462,673, which is a continuation of application No. 12/035,549, filed on Feb. 22, 2008, now Pat. No. 8,165,046, which is a continuation of application No. 11/674,548, filed on Feb. 13, 2007, now Pat. No. 7,379,441, which is a division of application No. 09/991,532, filed on Nov. 15, 2001, now Pat. No. 7,197,022.

(60) Provisional application No. 60/249,065, filed on Nov. 15, 2000.

(51) Int. Cl.
*H04L 1/00* (2006.01)
*H04W 56/00* (2009.01)
*H04W 72/14* (2009.01)
*H04B 7/155* (2006.01)
*H04B 7/212* (2006.01)
*H04L 5/16* (2006.01)

(52) U.S. Cl.
CPC ......... *H04B 7/2615* (2013.01); *H04B 7/2656* (2013.01); *H04B 7/2681* (2013.01); *H04L 1/0003* (2013.01); *H04L 1/0009* (2013.01); *H04L 5/16* (2013.01); *H04W 56/0085* (2013.01); *H04W 72/14* (2013.01)

(58) Field of Classification Search
CPC .. H04B 7/2681; H04B 7/2656; H04B 7/2615; H04L 5/16; H04L 1/0009; H04L 1/0003
See application file for complete search history.

(56) References Cited

U.S. PATENT DOCUMENTS

| | | | |
|---|---|---|---|
| 4,763,325 A | 8/1988 | Wolfe |
| 4,931,250 A | 6/1990 | Greszczuk |
| 4,975,906 A | 12/1990 | Takiyasu et al. |
| 5,130,983 A | 7/1992 | Heffner, III et al. |
| 5,157,395 A | 10/1992 | Del Signore et al. |
| 5,297,144 A | 3/1994 | Gilbert et al. |
| 5,361,399 A | 11/1994 | Linquist et al. |
| 5,384,777 A | 1/1995 | Ahmadi et al. |
| 5,402,422 A | 3/1995 | Liu et al. |
| 5,404,374 A | 4/1995 | Mullins et al. |
| 5,420,851 A | 5/1995 | Seshadri et al. |
| 5,444,698 A | 8/1995 | Kito |
| 5,457,687 A | 10/1995 | Newman |
| 5,511,082 A | 4/1996 | How et al. |
| 5,517,503 A | 5/1996 | Hess et al. |
| 5,533,004 A | 7/1996 | Jasper et al. |
| 5,533,024 A | 7/1996 | Owada |
| 5,537,414 A | 7/1996 | Takiyasu et al. |
| 5,546,411 A | 8/1996 | Leitch et al. |
| 5,548,541 A | 8/1996 | Bierman et al. |
| 5,594,720 A | 1/1997 | Papadopoulos et al. |
| 5,594,738 A | 1/1997 | Crisler et al. |
| 5,602,868 A | 2/1997 | Wilson |
| 5,615,212 A | 3/1997 | Ruszczyk et al. |
| 5,638,371 A | 6/1997 | Raychaudhuri et al. |
| 5,638,374 A | 6/1997 | Heath |
| 5,644,576 A | 7/1997 | Bauchot et al. |
| 5,666,358 A | 9/1997 | Paratore et al. |
| 5,675,573 A | 10/1997 | Karol et al. |
| 5,684,791 A | 11/1997 | Raychaudhuri et al. |
| 5,701,294 A | 12/1997 | Ward et al. |
| 5,706,428 A | 1/1998 | Boer et al. |
| 5,729,531 A | 3/1998 | Raith et al. |
| 5,751,708 A | 5/1998 | Eng et al. |
| 5,764,699 A | 6/1998 | Needham et al. |
| 5,768,254 A | 6/1998 | Papadopoulos et al. |
| 5,774,461 A | 6/1998 | Hyden et al. |
| 5,790,070 A | 8/1998 | Natarajan et al. |
| 5,790,551 A | 8/1998 | Chan et al. |
| 5,809,427 A | 9/1998 | Perreault et al. |
| 5,818,842 A | 10/1998 | Burwell et al. |
| 5,828,695 A | 10/1998 | Webb et al. |
| 5,844,906 A | 12/1998 | Khelghatti et al. |
| 5,859,619 A | 1/1999 | Wu et al. |
| 5,859,848 A | 1/1999 | Miura et al. |
| 5,886,995 A | 3/1999 | Arsenault et al. |
| 5,890,055 A | 3/1999 | Chu et al. |
| 5,892,796 A | 4/1999 | Rypinski |
| 5,909,469 A | 6/1999 | Frodigh et al. |
| 5,912,920 A | 6/1999 | Marchok et al. |
| 5,914,946 A | 6/1999 | Avidor et al. |
| 5,917,813 A | 6/1999 | Van Driel et al. |
| 5,918,171 A | 6/1999 | Funke et al. |
| 5,936,949 A | 8/1999 | Pasternak et al. |
| 5,940,006 A | 8/1999 | MacLellan et al. |
| 5,946,313 A | 8/1999 | Allan et al. |
| 5,963,543 A | 10/1999 | Rostoker et al. |
| 5,970,062 A | 10/1999 | Bauchot |
| 5,987,034 A | 11/1999 | Simon et al. |
| 5,991,286 A | 11/1999 | Labonte et al. |
| 6,006,069 A | 12/1999 | Langston et al. |
| 6,011,786 A | 1/2000 | Dent et al. |
| 6,016,311 A | 1/2000 | Gilbert et al. |
| 6,016,313 A | 1/2000 | Foster, Jr. et al. |
| 6,016,401 A | 1/2000 | Rostoker et al. |
| 6,026,133 A | 2/2000 | Sokoler et al. |
| 6,031,827 A | 2/2000 | Rikkinen et al. |
| 6,038,455 A | 3/2000 | Gardner et al. |
| 6,052,365 A | 4/2000 | Bhagalia et al. |
| 6,094,421 A | 7/2000 | Scott et al. |
| 6,108,374 A | 8/2000 | Balachandran et al. |
| 6,112,080 A | 8/2000 | Anderson et al. |
| 6,115,370 A | 9/2000 | Struhsaker et al. |
| 6,122,293 A | 9/2000 | Frodigh et al. |
| 6,125,148 A | 9/2000 | Frodigh et al. |
| 6,128,293 A | 10/2000 | Pfeffer et al. |
| 6,147,989 A | 11/2000 | Esaki et al. |
| 6,151,318 A | 11/2000 | Woodward et al. |
| 6,163,547 A | 12/2000 | De Vriendt et al. |
| 6,167,031 A | 12/2000 | Olofsson et al. |
| 6,175,550 B1 | 1/2001 | van Nee |
| 6,185,418 B1 | 2/2001 | MacLellan et al. |
| 6,188,680 B1 | 2/2001 | Ohki |
| 6,189,041 B1 | 2/2001 | Cox et al. |
| 6,201,811 B1 | 3/2001 | Larsson et al. |
| 6,201,813 B1 | 3/2001 | Klausmeier et al. |
| 6,208,663 B1 | 3/2001 | Schramm et al. |
| 6,208,873 B1 | 3/2001 | Black et al. |
| 6,233,231 B1 | 5/2001 | Felix et al. |
| 6,252,865 B1 | 6/2001 | Walton et al. |
| 6,330,278 B1 | 12/2001 | Masters et al. |
| 6,330,288 B1 | 12/2001 | Budka |
| 6,339,585 B1 | 1/2002 | Hulyalkar et al. |
| 6,351,499 B1 | 2/2002 | Paulraj et al. |
| 6,359,934 B1 | 3/2002 | Yoshida |
| 6,366,961 B1 | 4/2002 | Subbiah et al. |
| 6,370,112 B1 | 4/2002 | Voelker |
| 6,392,994 B1 | 5/2002 | Dubuc |
| 6,400,755 B1 | 6/2002 | Harris et al. |
| 6,404,755 B1 | 6/2002 | Schafer |
| 6,452,927 B1 | 9/2002 | Rich |
| 6,452,964 B1 | 9/2002 | Yoshida |
| 6,463,107 B1 | 10/2002 | Lindoff et al. |
| 6,469,991 B1 | 10/2002 | Chuah |
| 6,483,854 B1 | 11/2002 | Klausmeier et al. |
| 6,493,342 B1 | 12/2002 | Breslow et al. |
| 6,496,142 B1 | 12/2002 | Iinuma |
| 6,549,759 B2 | 4/2003 | Arviv et al. |
| 6,567,383 B1 | 5/2003 | Bhnke |
| 6,587,510 B1 | 7/2003 | Minami et al. |
| 6,608,841 B1 | 8/2003 | Koodli |
| 6,631,130 B1 | 10/2003 | Roy et al. |
| 6,665,292 B1 | 12/2003 | Bradshaw et al. |
| 6,665,296 B1 | 12/2003 | Sturza et al. |

(56) References Cited

U.S. PATENT DOCUMENTS

| | | |
|---|---|---|
| 6,671,328 B1 | 12/2003 | Poon et al. |
| 6,674,731 B1 | 1/2004 | Bradshaw et al. |
| 6,683,866 B1 | 1/2004 | Stanwood et al. |
| 6,697,364 B1 | 2/2004 | Kekki et al. |
| 6,701,129 B1 | 3/2004 | Hashem et al. |
| 6,711,176 B1 | 3/2004 | Pezeshki-Esfahani |
| 6,721,286 B1 | 4/2004 | Williams et al. |
| 6,741,614 B1 | 5/2004 | Porter et al. |
| 6,747,977 B1 | 6/2004 | Smith et al. |
| 6,748,021 B1 * | 6/2004 | Daly ............... H04L 1/0003 370/337 |
| 6,760,599 B1 | 7/2004 | Uhlik |
| 6,771,660 B1 | 8/2004 | Bourlas et al. |
| 6,785,252 B1 | 8/2004 | Zimmerman et al. |
| 6,804,211 B1 | 10/2004 | Klein et al. |
| 6,804,251 B1 | 10/2004 | Limb et al. |
| 6,862,622 B2 | 3/2005 | Jorgensen |
| 6,865,233 B1 * | 3/2005 | Eriksson ............ H04L 1/0003 375/261 |
| 6,870,932 B2 | 3/2005 | Jiang |
| 6,907,048 B1 | 6/2005 | Treadaway et al. |
| 6,918,034 B1 | 7/2005 | Sengodan et al. |
| 6,925,068 B1 | 8/2005 | Stanwood et al. |
| 6,931,030 B1 | 8/2005 | Dogan |
| 6,940,823 B1 | 9/2005 | Park et al. |
| 6,944,672 B2 | 9/2005 | Crow et al. |
| 6,963,751 B1 | 11/2005 | Kordsmeyer et al. |
| 6,967,936 B1 | 11/2005 | Laroia et al. |
| 6,968,554 B1 | 11/2005 | Macdonald et al. |
| 6,970,941 B1 | 11/2005 | Caronni et al. |
| 7,006,525 B1 | 2/2006 | Jha |
| 7,006,526 B1 | 2/2006 | Biederman |
| 7,020,715 B2 | 3/2006 | Venkataraman et al. |
| 7,031,281 B1 | 4/2006 | Zhang |
| 7,050,407 B1 | 5/2006 | Frazer et al. |
| 7,061,935 B1 | 6/2006 | Roy et al. |
| 7,068,639 B1 | 6/2006 | Varma et al. |
| 7,085,291 B2 | 8/2006 | Zhang et al. |
| 7,197,022 B2 | 3/2007 | Stanwood et al. |
| 7,230,931 B2 | 6/2007 | Struhsaker |
| 7,260,405 B2 | 8/2007 | Kim et al. |
| 7,321,569 B2 | 1/2008 | Takagi et al. |
| 7,433,334 B2 | 10/2008 | Marjelund et al. |
| 7,443,814 B2 | 10/2008 | Agarwal et al. |
| 7,471,620 B2 | 12/2008 | Alazraki et al. |
| 7,519,023 B2 | 4/2009 | Klein et al. |
| 7,551,937 B2 | 6/2009 | Kim et al. |
| 7,570,645 B2 | 8/2009 | Agarwal |
| 7,583,623 B2 | 9/2009 | Zimmerman et al. |
| 8,619,719 B2 | 12/2013 | Wengerter et al. |
| 9,935,705 B2 | 4/2018 | Klein et al. |
| 10,117,234 B2 * | 10/2018 | Stanwood ............ H04B 7/2615 |
| 2001/0015985 A1 | 8/2001 | Van Grinsven et al. |
| 2001/0048681 A1 | 12/2001 | Bilic et al. |
| 2002/0016852 A1 | 2/2002 | Nishihara |
| 2002/0089984 A1 | 7/2002 | Jiang |
| 2002/0090005 A1 | 7/2002 | Jiang et al. |
| 2002/0126677 A1 | 9/2002 | Hathaway et al. |
| 2002/0136170 A1 | 9/2002 | Struhsaker |
| 2003/0045307 A1 | 3/2003 | Arviv et al. |
| 2003/0125040 A1 | 7/2003 | Walton et al. |
| 2003/0169722 A1 | 9/2003 | Petrus et al. |
| 2004/0132459 A1 * | 7/2004 | Varma ............... H04L 1/0025 455/452.2 |
| 2005/0100120 A1 | 5/2005 | Barton et al. |
| 2005/0220110 A1 | 10/2005 | Agarwal |
| 2006/0062250 A1 | 3/2006 | Payne |
| 2006/0262808 A1 | 11/2006 | Lin et al. |
| 2008/0081651 A1 | 4/2008 | Kuroda et al. |
| 2008/0267168 A1 * | 10/2008 | Cai ............... H04L 1/0015 370/352 |
| 2011/0075684 A1 | 3/2011 | Zeng et al. |
| 2015/0365927 A1 * | 12/2015 | Stanwood ............ H04L 1/0009 370/280 |

FOREIGN PATENT DOCUMENTS

| | | |
|---|---|---|
| EP | 507384 B1 | 7/1998 |
| EP | 913968 A1 | 5/1999 |
| EP | 891060 A3 | 8/2001 |
| EP | 845916 B1 | 3/2005 |
| EP | 622924 B1 | 12/2006 |
| EP | 755164 B1 | 12/2006 |
| EP | 1073301 B1 | 10/2007 |
| EP | 917316 B1 | 11/2007 |
| EP | 915592 B1 | 2/2009 |
| EP | 903883 B1 | 4/2009 |
| EP | 944200 B1 | 6/2009 |
| EP | 720405 B1 | 2/2011 |
| JP | 1041876 A | 2/1998 |
| JP | 11266231 A | 9/1999 |
| WO | 9222162 A1 | 12/1992 |
| WO | 9713388 A1 | 4/1997 |
| WO | 98/010566 | 3/1998 |
| WO | 9810568 A1 | 3/1998 |
| WO | 9827747 A2 | 6/1998 |
| WO | 9851111 A1 | 11/1998 |
| WO | 9909775 A2 | 2/1999 |
| WO | 99/012281 | 3/1999 |
| WO | 9921313 A2 | 4/1999 |
| WO | 9938343 A2 | 7/1999 |
| WO | 9939532 A1 | 8/1999 |
| WO | 00/01188 A1 | 1/2000 |
| WO | 0021235 A1 | 4/2000 |
| WO | 0028694 A1 | 5/2000 |
| WO | 00/72626 A1 | 11/2000 |
| WO | 00/76109 A1 | 12/2000 |
| WO | 01/05100 A1 | 1/2001 |
| WO | 01/08369 A1 | 2/2001 |
| WO | 01/10046 A2 | 2/2001 |
| WO | 01/33772 A1 | 5/2001 |

OTHER PUBLICATIONS

Alwakeel et al. "DPAP: A Dynamic Polling Based Access Protocol for Wireless Networks", The Ninth IEEE International Symposium on Personal, Indoor and Mobile Radio Communications, Sep. 1998. pp. 1126-1130.

Andersen et al. "Prediction of Future Fading Based on Past Measurements." Vehicular Technology Conference, VTC 99, vol. 1, pp. 151-155.

Arad. "Resource Allocation and Channel Access Control in Multimedia Wireless CDMA Networks", Ph.D. Thesis, University of Toronto, 2000.

Aruncahalam et al. "DOCSIS based MAC layer proposal for BWA", IEEE 802.16mc-99/04, Oct. 21, 1999.

Bender et al. "CDMA/HDR: A Bandwidth Efficient High Speed Wireless Data Service for Nomadic Users." Communications Magazine, IEEE. 38(7):70-77. Jul. 2000.

Blogh et al. "Dynamic Channel Allocation Techniques Using Adaptive Modulation and Adaptive Antennas", IEEE Journal on Selected Areas in Communications, Sep. 1999.

Cable Television Laboratories, Inc., "Data-Over-Cable Service Interface Specifications Radio Frequency Interface Specification", SP-RFIv1.1-101-990311, 1999-2005, 320 pages.

Catreux et al. "Adaptive Modulation and MIMO Coding for Broadband Wireless Data Networks", IEEE Communications Magazine, Jun. 2002.

Cavers. "Variable-Rate Transmission for Rayleigh Fading Channels", IEEE Transactions on Communications, vol. Com-20, No. 1, Feb. 1972.

Chen et al. "A Comparison of MAC Protocols for Wireless Local Networks Based on Battery Power Consumption", IEEE Proceedings, INFOCOM '98. Seventeenth Annual Joint Conference of the IEEE Computer and Communications Societies, Apr. 1998.

Chen et al. "Comparative analysis of wireless ATM channel access protocols supporting multimedia traffic", Baltzer Journals, Sep. 17, 1997.

Chua et al. "Adaptive Coded Modulation for Fading Channels", Proc. IEEE Int. Conference Communications, 1997.

(56) References Cited

OTHER PUBLICATIONS

Chuang et al. "High-Speed Wireless Data Access Based on Combining Edge with Wideband OFDM", Topics in Broadband Access, IEEE Communications Magazine, Nov. 1999.
Chuang. "An OFDM-based System with Dynamic Packet Assignment and Interference Suppression for Advanced Cellular Internet Service", IEEE Global Telecommunications Conference, 1998. GLOBECOM 1998. The Bridge to Global Integration. Nov. 1998. pp. 974-979.
Dutton. "Asynchronous Transfer Mode (ATM) Technical Overview." 2.sup.nd Edition, Prentice Hall, Oct. 1995, Chap. 3, pp. 21-25.
Frigon. "Dynamic Reservation TDMA Medium Access Control Protocol for Wireless ATM Networks", M.A.S. Thesis, University of British Columbia, Aug. 1998.
Garg et al. "Third Generation (3G) Mobile Communications Systems", 1999 IEEE International Conference on Personal Wireless Communication, Feb. 1999.
Goldsmith et al. "Adaptive Coded Modulation for Fading Channels", IEEE Transactions on Communications, vol. 46, No. 5, May 1998.
Goldsmith. "Adaptive Modulation and Coding for Fading Channels" Proceedings of the 1999 IEEE, Information Theory and Communications Workshop, Jun. 1999.
Grünheid et al. "Adaptive Modulation and Multiple Access for the OFDM Transmission Technique" Wireless Personal Communications, vol. 13, Issue 1, May 2000.
Hakegard. "Coding and Modulation for LMDS and Analysis of the LMDS Channel", Journal of Research of the National Institute of Standards and Technology, vol. 105, No. 5, Sep.-Oct. 2000.
Holtkamp et al. "A Distributed Media Access Control (DMAC) for Wireless ATM Networks", Preliminary Version, 5th International Conference on Telecommunication Systems—Modelling and Analysis, Mar. 1997.
IEEE 802.16.1mc-00/21r1 Broadband Wireless Access Working Group, Media Access Control Layer Proposal for the 802.16.1 Air Interface Specification. Jul. 7, 2000.
Ikeda et al. "The performance of adaptive modulation with dynamic channel assignment in multimedia traffic", IEEE 1998 International Conference on Universal Personal Communications, 1998. ICUPC '98, Oct. 1998.
International Preliminary Examination Report for PCT/US00/29687 dated Dec. 18, 2001.
International Search Report for PCT/US00/20577 dated Jan. 5, 2001, 5 pages.
International Search Report for PCT/US00/29687 dated Mar. 21, 2001, 3 pages.
International Search Report for PCT/US01/43582 dated Aug. 20, 2002, 3 pages.
Jagannath et al. "An Adaptive Data Link Layer Protocol for Wireless ATM Networks", M.S. Thesis, University of Mysore, 1994.
Jain. "On the Impact of Channel and Channel Quality Estimation on Adaptive Modulation." Dec. 2002, 92 pages.
Jeong et al. "CDMA/TDD System for Wireless Multimedia Services with Traffic Unbalance Between Uplink and Downlink", IEEE Journal on Selected Areas in Communications, vol. 17, No. 5, May 1999. pp. 939-946.pp. 523-527.
Kim et al. "Adaptive Coded-Modulation in Multipath Fading Channels", 1999 IEEE Vehicular Technology Conference, Sep. 1999.
Kim et al. "Adaptive Coded-Modulation in Slow Fading Channels", Journal of Communications and Networks, vol. 1, No. 2, Jun. 1999.
Klein. "PHY layer proposal for BWA", IEEE 802.16.1pc-00/04, Dec. 24, 1999.
Lau et al. "On channel adaptive multiple access control with queued transmission requests for wireless ATM", ATM 2000. Proceedings of the IEEE Conference on High Performance Switching and Routing, Jun. 2000. pp. 473-481.
Lee. "Convolutional Coding, Fundamentals and Applications." Artech House, Inc. 1997, p. 11-51.
Leiba. "Amber Proposal for 802.16 MAC Layer", IEEE 802.16mc-99/06, Oct. 28, 1999.
Leung et al. "Dynamic Allocation of Downlink and Uplink Resource for Broadband Services in Fixed Wireless Networks", IEEE Journal on Selected Areas in Communications, vol. 17, No. 5, pp. 990-1006, May 1999.
Lin et al. "Error Control Coding, Fundamentals and Applications." Prentice-Hall Computer Applications in Electrical Engineering Series., 1993, pp. 315-349.
Lindell et al. "Radio Access Technology Evolution", Ericsson Review, 1993.
Linnenbank et al. "A Request—TDMA Multiple-Access Scheme for Wireless Multimedia Networks", In: Third International Workshop on Mobile Multimedia Communications, MoMuC-3, Sep. 25-27, 1996.
Lupo et al. "Dynamic Resource Allocation with a Soft Handover Procedure for Application in a Broadband System", IEEE VTS 50th Vehicular Technology Conference, 1999. VTC 1999—Fall, Sep. 1999. pp. 2111-2115.
Matsuoka et al. "Adaptive Modulation System with Variable Coding Rate Concatenated Code for High Quality Multi-Media Communication Systems." Apr. 28, 1996. IEEE. pp. 487-491.
Mollenauer et al, "MAC Proposal for IEEE 802.16.1", IEEE 802.16.1mc-00/10, Feb. 25, 2000.
Mollenauer et al. "An Efficient Media Access Control Protocol for Broadband Wireless Access Systems", IEEE 802.16mc-99/10, Oct. 28, 1999.
Mollenauer et al. "MAC Proposal for IEEE 802.16.1", IEEE 802.16mc-00_07, Jan. 5, 2000.
Motorola. "Adaptive Modulation and Coding (AMC)", TSGR1#17(00)1395, Oct. 20-24, 2000.
Nandra et al. "Adaptation Techniques in Wireless Packet Data Services", IEEE Communications Magazine, Jan. 2000.
Naper. TS 25.225 V0.1.0 (Sep. 1999), "GSM 03.60", Sep. 1999.
Narlikar et al. "Designing Multihop Wireless Backhand Networks with Delay Guarantees." Bell Labs, 2005.
Notice of Allowance for U.S. Appl. No. 09/430,379 dated Jul. 28, 2003.
Office Action issued in U.S. Appl. No. 09/430,379 dated Jan. 15, 2003.
Papadopoulos et al. "Reduction of MiXed Co-channel Interference in Microcellular STDD Systems." Vehicular Technology Conference. 1995 IEEE 45.sup.th, vol. 2, pp. 759-763.
Passas et al. "MAC protocol and traffic scheduling for wireless ATM networks", Mobile Networks and Applications, May 2001.
Pearce et al. "Comparison of counter-measures against slow Rayleigh fading for TDMA systems", IEEE Colloquium on Advanced TDMA Techniques and Applications (Digest No. 1996/234), Oct. 28, 1996.
Pons et al. "Bit Error Rate Characterisation and Modelling for GSM." IEEE 1998, pp. 3722-3727.
Redl et al. "An Introduction to GSM." Artech House, Inc. 1995, pp. 84-85 and 95.
Rohling et al. "Adaptive Coding and Modulation in an OFDM-TDMA Communication System", 48th IEEE Vehicular Technology Conference, VTC 98, May 1998.
Rohling et al. "Performance of an OFDM-TDMA Mobile Communication System", IEEE Proceedings on the Conference on Vehicular Technology, 1996.
Sampei et al. "Adaptive Modulation/TDMA Scheme for Personal Multi-Media Communication System." Proceedings of the Global Telecommunications Conference, U.S., New York, IEEE. Nov. 28, 1994, pp. 989-993.
Sater et al. "Media Access Control Layer Proposal for the 802.16.1 Air Interface Specification." IEEE 802.16 Broadband Wireless Access Working Group, Online! Jul. 7, 2000, XP002210334 retrieved from the Internet: <URL: http://wirelessman.org/tgl/mac/contrib/802161mc-00.sub.1321rl.pdf> retrieved Aug. 20, 2002, pp. 69-80.
Shannon. "A Mathematical Theory of Communication." Bell System Technical Journal, pp. 379-423 (Part 1), 623-656 (Part 2), Jul. 1948.
Third Generation Partnership Project Technical Report, Technical Specification Group Radio Access Network, 3GPP TR 25.848

(56) References Cited

OTHER PUBLICATIONS

V4.0.0 (Mar. 2001) "Physical Layer Aspects of UTRA High Speed Downlink Packet Access (Release 4)", Mar. 2001.
Third Generation Partnership Project Technical Report, Technical Specification Group, Working Group, 3GPP TS 25.301 V3.2.0 (Oct. 1999) "Radio Interface Protocol Architecture", Oct. 1999.
Torrance et al. "Upper bound performance of adaptive modulation in a slow Rayleigh fading channel." IEEE Electronics Letters. 32(8):718-719, Apr. 11, 1996.
U.S. District Court, Northern District of California, "Amended Complaint for Declaratory Judgment Demand for Jury Trial" filed Sep. 30, 2008 in Case No. 5:08-cv-4555.
Ue et al. "Symbol Rate and Modulation Level Controlled Adaptive Modulation/TDMA/TDD for Personal Communication Systems." Proceedings of the Vehicular Technology Conference, U.S., New York, IEEE, vol. Conf. 45, Jul. 25, 1995, pp. 306-310.
Ulm et al. "Data-Over-Cable Interface Specifications, Radio Frequency Interface Specification." Hewlett Packard Interim Specification, Doc. Control No. SP-RFII01-970321, published Mar. 21, 1997 by MCNS Holdings, L.P. Section 6, pp. 43-85.
Wolf et al. "On the Weight Distribution of Linear Block Codes Formed From Convolutional Codes." IEEE, IEEE Transactions on Communications, vol. 44, Sep. 9, 1996.

\* cited by examiner

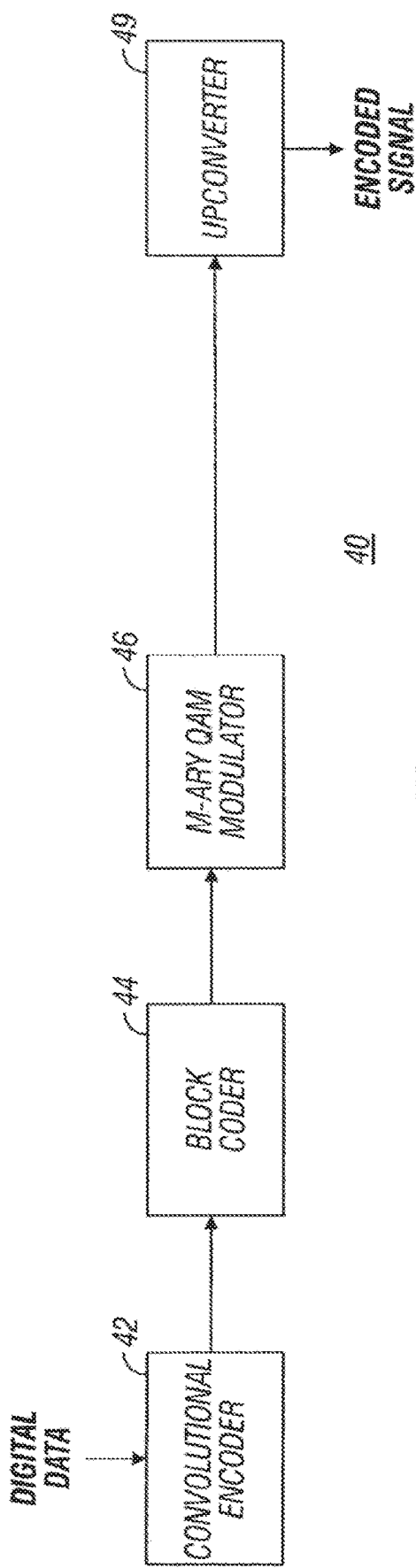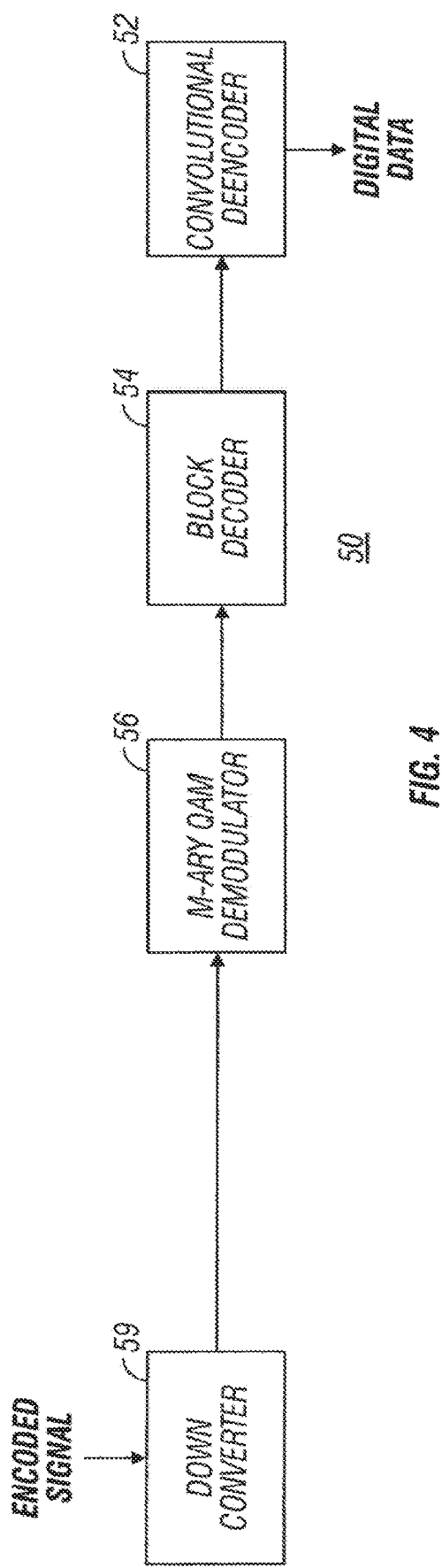

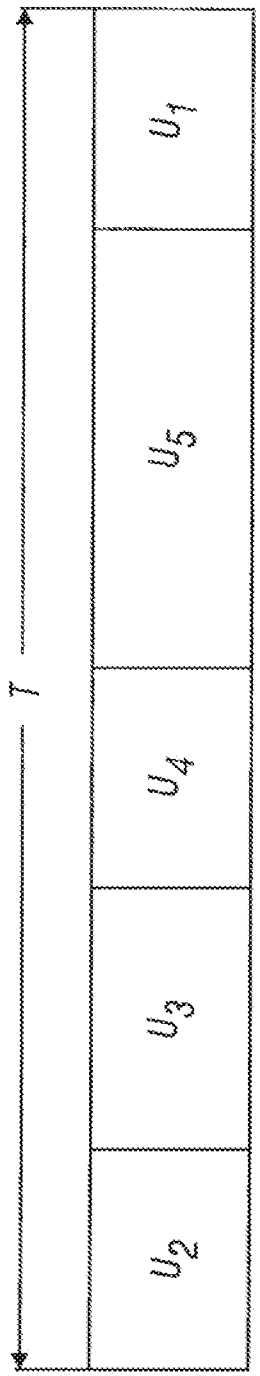
FIG. 14
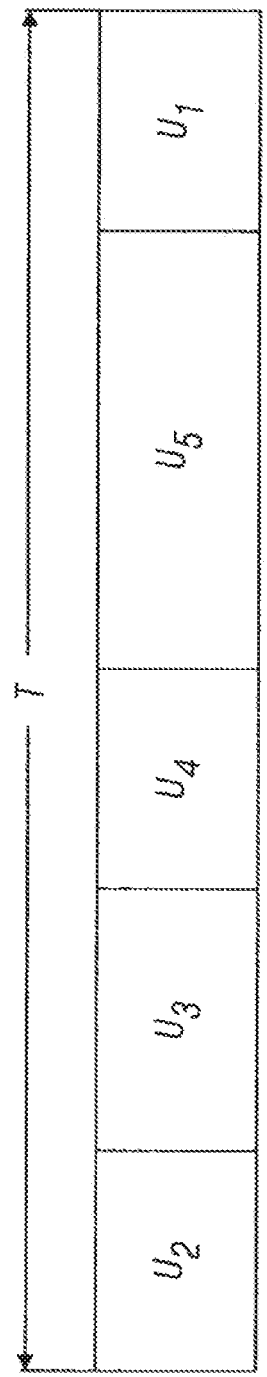
FIG. 15: $D_1 \geq U_2$

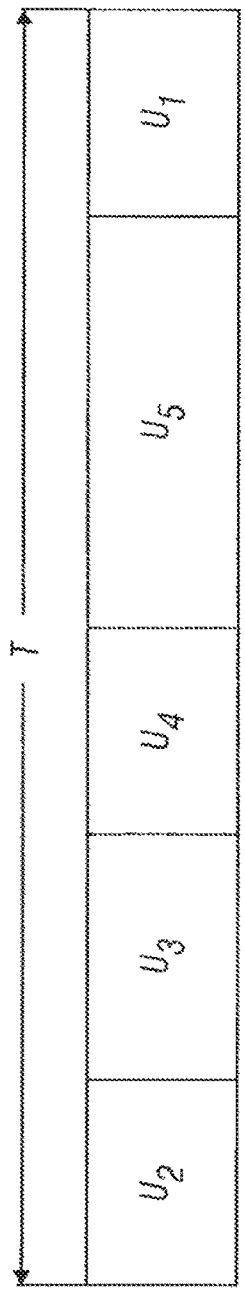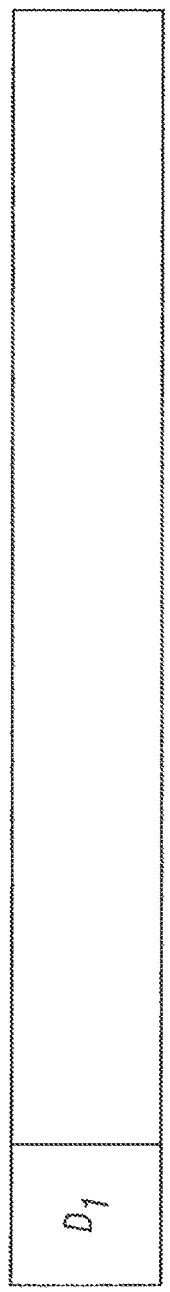
FIG. 16: $D_1 < U_2$
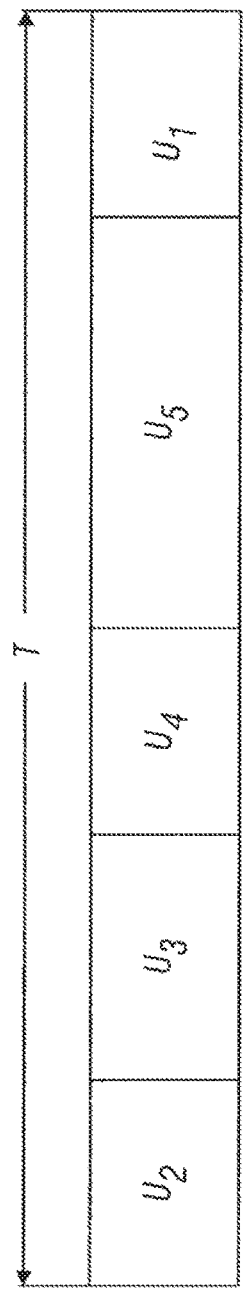
FIG. 17: $D_2 < U_3$

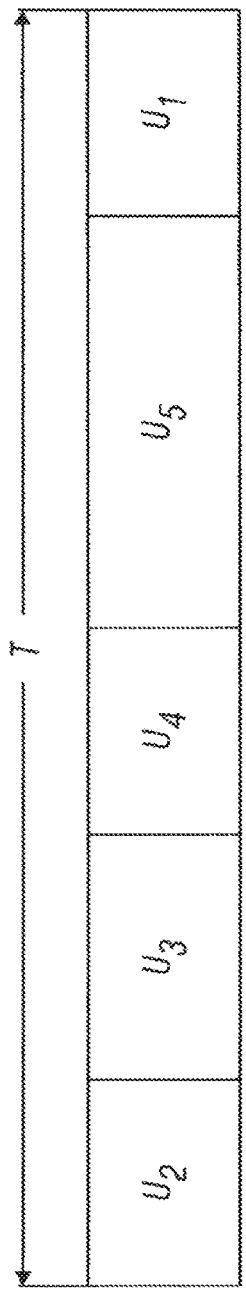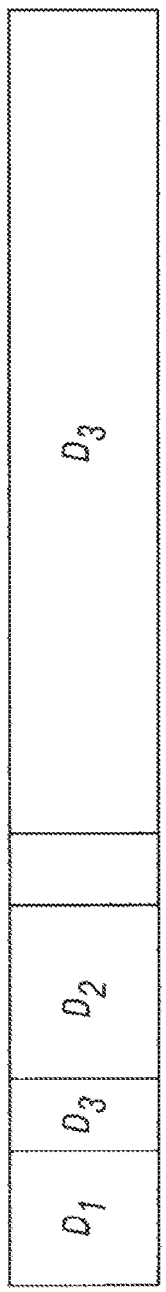
FIG. 18: $D_3 > U_4 + U_5 + U_1$
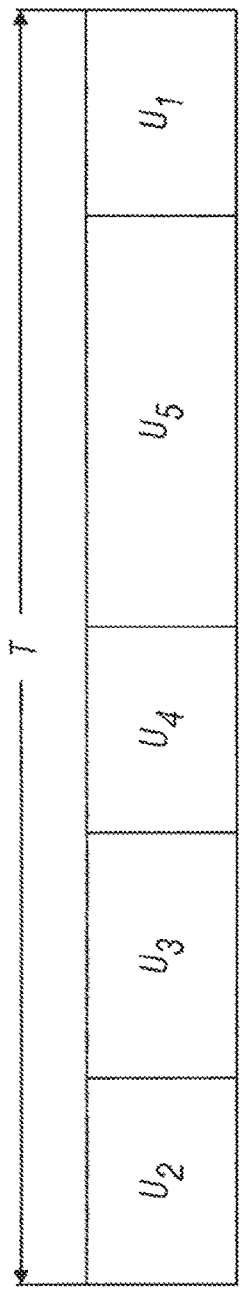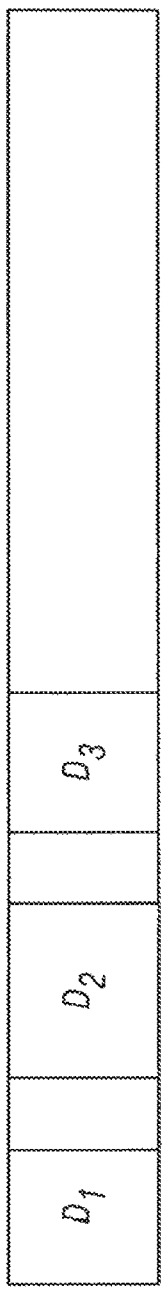
FIG. 19: $D_3 < U_4$

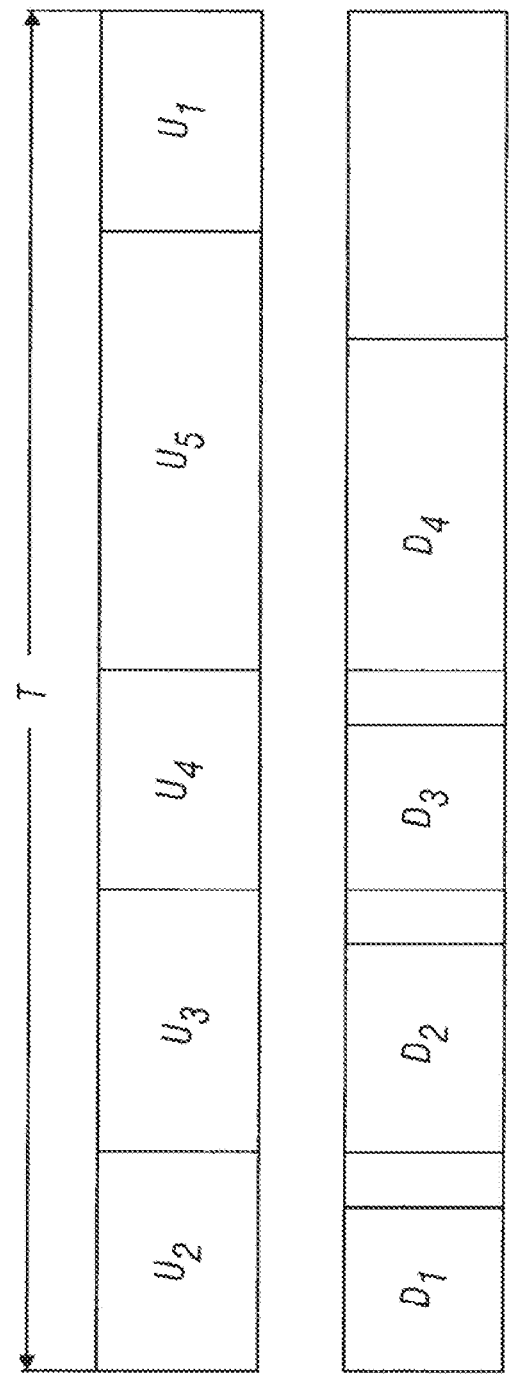

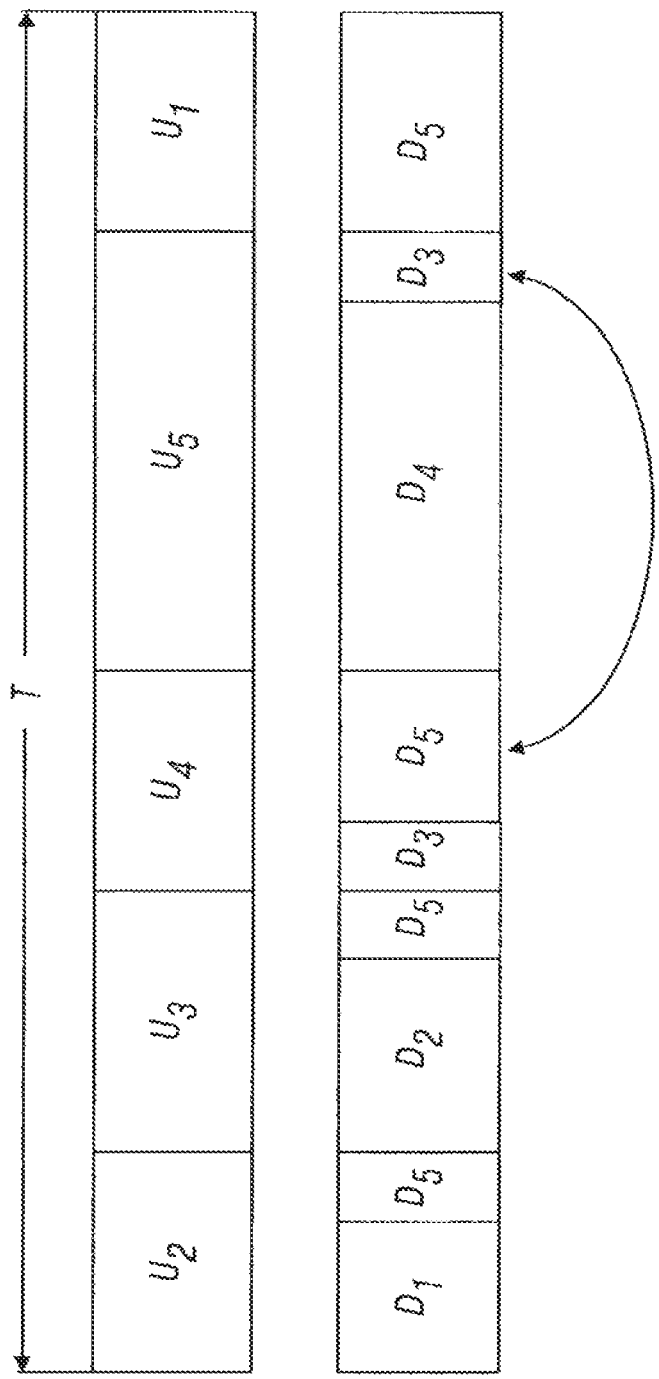

FRAMING FOR AN ADAPTIVE MODULATION COMMUNICATION SYSTEM

RELATED APPLICATIONS

This application is a continuation of U.S. patent application Ser. No. 14/835,471 filed Aug. 25, 2015, which is a continuation of U.S. patent application Ser. No. 13/903,712 filed May 28, 2013, now U.S. Pat. No. 9,191,940, which is a continuation of U.S. patent application Ser. No. 13/427,692 filed Mar. 22, 2012, now U.S. Pat. No. 8,462,673, which is a continuation of U.S. patent application Ser. No. 12/035,549 filed Feb. 22, 2008, now U.S. Pat. No. 8,165,046, which is a continuation of U.S. patent application Ser. No. 11/674,548 filed Feb. 13, 2007, now U.S. Pat. No. 7,379,441, which is a divisional of U.S. patent application Ser. No. 09/991,532 filed Nov. 15, 2001, now U.S. Pat. No. 7,197,022, titled "Framing For An Adaptive Modulation Communication System" which claims priority to a U.S. provisional patent application Ser. No. 60/249,065, filed Nov. 15, 2000, titled "Framing For an Adaptive Modulation Communication System," all of which are hereby incorporated by reference in their entirety.

BACKGROUND OF THE INVENTION

Field of the Invention

This invention relates to frame structures for communication systems and more particularly to frame structures for adaptive modulation wireless communication systems.

Description of Related Art

A wireless communication system facilitates two-way communication between a plurality of subscriber units (fixed and portable) and a fixed network infrastructure. Exemplary communication systems include mobile cellular telephone systems, personal communication systems (PCS), and cordless telephones. The key objective of these wireless communication systems is to provide communication channels on demand between the plurality of consumer subscriber units and their respective base stations in order to connect the subscriber unit user with the fixed network infrastructure.

Subscriber units typically communicate through a terminal with the base station using a "duplexing" scheme thus allowing the exchange of information in both directions of connection. Transmissions from the base station to the terminals are commonly referred to as "downlink" transmissions. Transmissions from the terminals to the base station are commonly referred to as "uplink" transmissions. In wireless systems having multiple access schemes a time "frame" is used as the basic information transmission unit.

Depending upon the design criteria of a given system, systems have typically used either time division duplexing (TDD) or frequency division duplexing (FDD) methods to facilitate the exchange of information between the base station and the terminals. In a TDD communication system, the base station and the terminals use the same channel, however, their downlink and uplink transmissions alternate one after the other to prevent interference. In a FDD communication system, the base station and the terminals use different channels for their downlink and uplink transmissions, respectively. Thus, the concern for interference between uplink and downlink transmissions is mitigated in a FDD communication system as compared to a system using TDD. However, the increased cost and complexity in deploying a FDD communication system often outweighs this obvious advantage over a TDD communication system.

In both TDD and FDD systems, each base station and terminal includes a modem configured to modulate an outgoing signal and demodulate an incoming signal. If the modem is configured to modulate and demodulate simultaneously, the modem is a "full-duplex" modem. If the modem is not configured to modulate and demodulate simultaneously, but rather switches between modulating and demodulating, the modem is a "half-duplex" modem.

In an exemplary FDD communication system, each terminal's modem operates simultaneously to transmit and receive information in a full-duplex manner. Such a terminal can continually receive data from the base station. By continually receiving information, the terminal is able to maintain its synchronization with the base station. By maintaining its synchronization, the terminal is less dependent on the base station transmitting control information and preambles to assist the terminal in locating its data within the downlink.

Because a half-duplex terminal does not receive information from the base station when the terminal transmits it uplink to the base station, it may fall out of synchronization with the base station. When this occurs, the terminal may require the base station to downlink additional control information or a preamble to allow the terminal to re-synchronize prior to it receiving downlink data from the base station.

SUMMARY OF THE INVENTION

The systems and methods have several features, no single one of which is solely responsible for its desirable attributes. Without limiting the scope as expressed by the claims which follow, its more prominent features will now be discussed briefly. After considering this discussion, and particularly after reading the section entitled "Detailed Description" one will understand how the features of the system and methods provide several advantages over traditional framing techniques.

One aspect is a frequency division duplexing (FDD) wireless communication method for use by a base station, at least one full-duplex terminal, and at least one half-duplex terminal, wherein the base station transmits using a downlink subframe on a first channel and the full-duplex and half-duplex terminals transmit using an uplink subframe on a second channel, wherein the downlink subframe includes a broadcast preamble, a time division multiplex (TDM) portion, and a Time Division Multiple Access (TDMA) portion, and wherein the TDMA portion includes at least one modulation/forward error correction (PHY) mode with an associated preamble, both of which are intended for the at least one half-duplex terminal. The method comprises transmitting a broadcast preamble from a base station to a full-duplex terminal and a half-duplex terminal during a downlink subframe on a first channel, synchronizing the full-duplex terminal and the half-duplex terminal to the base station based on the broadcast preamble, transmitting modulated data from the half-duplex terminal to the base station during an uplink subframe on a second channel, and transmitting modulated data from the base station to the full-duplex terminal during a TDM portion of the downlink subframe on the first channel after the full-duplex terminal is synchronized with the base station. The method further includes transmitting a preamble by the base station during a TDMA portion of the downlink subframe on the first channel, wherein the preamble is transmitted after the half-duplex terminal has transmitted its modulated data to the base station, re-synchronizing the half-duplex terminal with the base station based on the preamble transmitted by the base station on the first channel.

Another aspect is a system for a frequency division duplexing (FDD) wireless communication system including a base station, at least one full-duplex terminal, and at least one half-duplex terminal, wherein the base station transmits using a downlink subframe on a first channel and the full-duplex and half-duplex terminals transmit using an uplink subframe on a second channel, wherein the downlink subframe includes a broadcast preamble, a time division multiplex (TDM) portion, and a Time Division Multiple Access (TDMA) portion, and wherein the TDMA portion includes at least one modulation/forward error correction (PHY) mode with an associated preamble, both of which are intended for the at least one half-duplex terminal. The system comprises at least one half-duplex terminal configured to alternate between transmitting on a first channel and receiving on a second channel, at least one full-duplex terminal configured to transmit on the first channel while receiving on the second channel, and a base station configured to transmit a broadcast preamble to the half-duplex terminal and the full-duplex terminal during a TDM portion of a downlink subframe and to transmit a preamble during a TDMA portion of the downlink subframe, wherein the half-duplex terminal synchronizes with the base station based on the broadcast preamble and re-synchronizes with the base station based on the preamble.

Still another aspect is a method for scheduling modulation/forward error correction (PHY) modes for a frequency division duplex (FDD) communication system which includes a plurality of terminals and a base station, both configured to communicate using adaptive modulations in a downlink subframe and an uplink subframe, with each of the plurality of terminals having an associated preferred downlink PHY mode, D1, D2, . . . DN, wherein D1 is a most robust modulation and DN is a least robust modulation, and wherein each of the plurality of terminals and their associated preferred downlink PHY mode have an associated uplink PHY mode, U1, U2, UN, and wherein U1 is associated with the plurality of terminals that have the preferred downlink PHY mode D1, and wherein UN is associated with the plurality of terminals that have the preferred downlink PHY mode DN, such that a number of downlink map entries does not exceed 2N+1. The method comprises grouping the plurality of terminals based on preferred downlink PHY modes, allocating uplink bandwidth in an uplink subframe such that the plurality of terminals are put in order of their preferred downlink PHY modes, from a second most robust preferred downlink PHY mode and continuing in order of decreasing robustness with a most robust preferred downlink PHY mode last, allocating the plurality of terminals that use a D1 PHY mode to begin at a start of a downlink subframe, and if a time duration for the plurality of terminals that have a DN PHY mode is less than a time duration for the plurality of terminals that are assigned to a UN+1 PHY mode, allocating bandwidth of the downlink subframe to the plurality of terminals that use the DN PHY mode, beginning at a time that a UN PHY mode ends. The method further includes that if the time duration for the plurality of terminals that have the DN PHY mode is greater than or equal to the time duration for the plurality of terminals that are assigned to the UN+1 PHY mode, allocating bandwidth of the downlink subframe to the plurality of terminals that use the DN PHY mode, beginning at an end of a DN−1 PHY mode, if the time duration of the plurality of terminals that have the DN PHY mode is longer in duration than a combined time duration of a U1 PHY mode and gaps that are not aligned with the UN PHY mode, rearranging downlink bandwidth of the downlink subframe to accommodate a remainder of the DN PHY mode such that the remainder is not aligned with the UN PHY mode, and if the time duration of the plurality of terminals that have the DN PHY mode is shorter in duration than the combined time duration of the U1 PHY mode and the gaps that are not aligned with the UN PHY mode, allocating bandwidth of the downlink subframe to the plurality of terminals that use the DN PHY mode, beginning at the end of the DN−1 PHY mode and also interleaved in the gaps in the downlink subframe.

Still other aspects include methods and systems for use in a TDD communication system to support the implementation of smart antennae.

BRIEF DESCRIPTION OF THE DRAWINGS

FIG. 3 is a block diagram of an exemplary transmitter.

FIG. 4 is a block diagram of an exemplary receiver.

FIG. 14 shows an ordering of uplink PHY modes, $U_2$, $U_3$, $U_4$, $U_5$, $U_1$, within an uplink subframe.

FIG. 15 represents the situation where the duration of downlink PHY mode $D_1$ equals or exceeds the duration of uplink PHY mode $U_2$.

FIG. 16 represents the converse case to FIG. 15, in which the duration of downlink PHY mode $D_1$ is less than the duration of uplink PHY mode $U_2$.

FIG. 17 represents the situation where the duration of uplink PHY mode $U_3$ exceeds the duration of downlink PHY mode $D_2$.

FIG. 18 represents the situation where the duration of downlink PHY mode $D_3$ exceeds the combined duration of uplink PHY modes $U_4$, $U_5$, and $U_1$.

FIG. 19 represents the situation where the duration of downlink PHY mode $D_3$ is less than the duration of uplink PHY mode $U_4$.

FIG. 20 represents the situation where the duration of downlink PHY mode $D_4$ is less than the duration of uplink PHY mode $U_5$.

FIG. 22 represents further rearrangement of downlink PHY mode $D_5$ with downlink PHY mode $D_3$ so that downlink PHY mode $D_5$ does not transmit while it receives.

DETAILED DESCRIPTION

The following detailed description is directed to certain specific embodiments of the invention. However, the invention can be embodied in a multitude of different systems and methods. In this description, reference is made to the drawings wherein like parts are designated with like numerals throughout.

Figure 1:
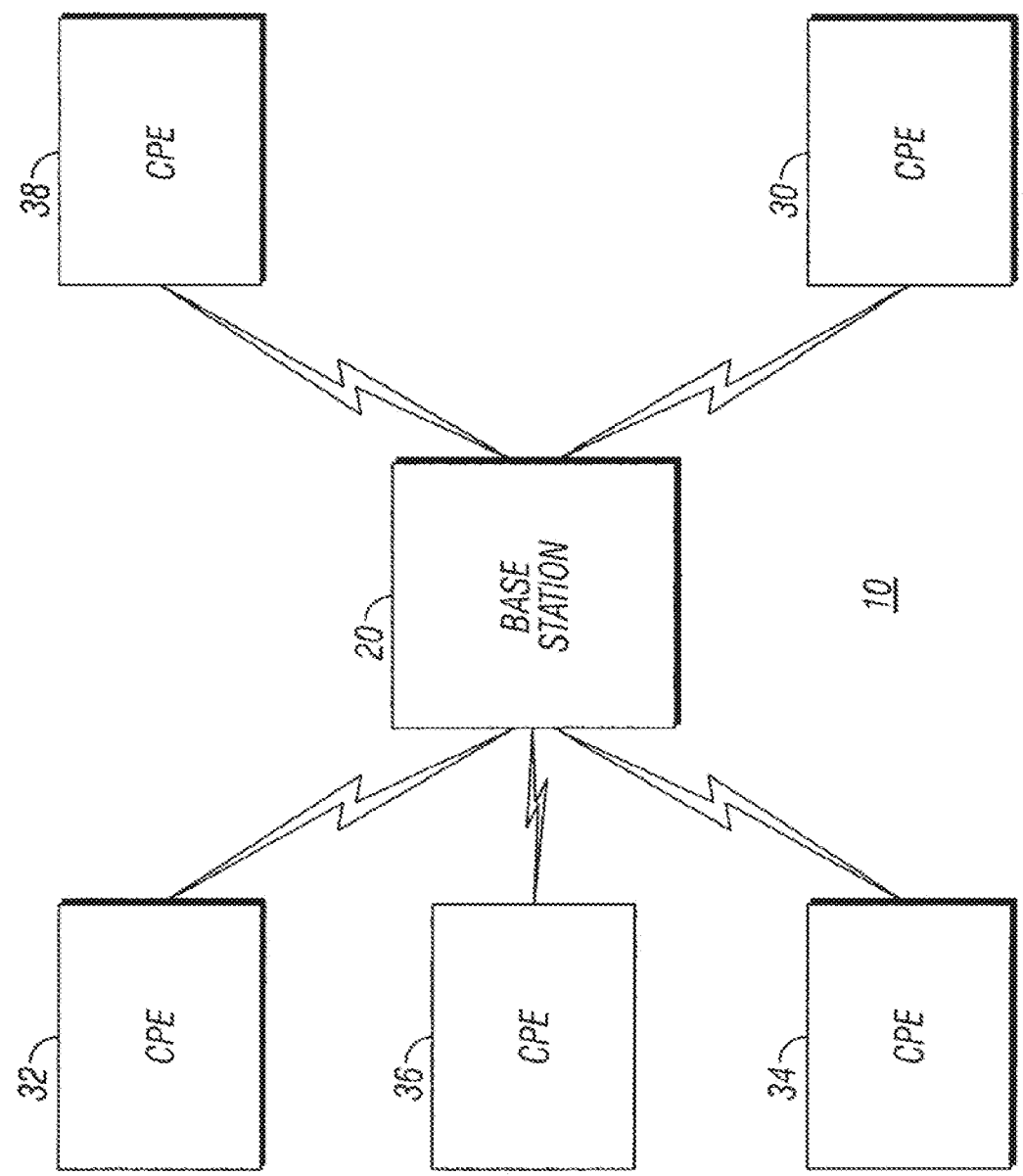
FIG. 1 is a diagram of a configuration of a communication system with a base station and several associated terminals.

FIG. 1 is a diagram of an exemplary cell 10 that includes a base station 20 located centrally in cell 10 and a plurality of terminals 30, 32, 34, 36, 38 associated with the base station. FIG. 1 does not show buildings or other physical obstructions (such as trees or hills, for example), that may cause channel interference between signals of the terminals. The terminals and the base station communicate by transmitting radio frequency signals. The term channel is used to mean a band or range of radio frequencies of sufficient width for communication, e.g., 26.500 GHz to 26.525 GHz (a 25 MHz wide channel). Although the following discussion relates to a system that transmits information within the Local Multi-Point Distribution Services (LMDS) band at frequencies of approximately 28 GHz, the system is not so limited. Embodiments of the system are designed to transmit information between the terminals and base station at frequencies, for example, of 10 GHz to 66 GHz using Quadrature Amplitude Modulation (QAM) symbols. The base station and terminals use adaptive modulation and forward error correction (FEC) schemes to communicate. Adaptive modulation, or adaptable modulation density, includes varying the bit per symbol rate modulation scheme, or modulation robustness, of signals transmitted between a terminal and a base station. Adaptive FEC includes varying the amount of error correction data that is transmitted in the signal. Both the modulation and FEC can be adapted independently to transmit data between the base station and terminals. For ease of explanation, the phrase "PHY mode" is used to indicate a combination of a selected modulation scheme with a selected FEC.

The systems and methods described herein can also be implemented in a Multichannel Multi-point Distribution Service (MMDS) which operates below 10 GHz. In the MMDS, Orthogonal Frequency Division Multiplexing (OFDM) symbols may be transmitted between the base station and terminals as an alternative to QAM modulation. In such a system, the methods and systems are applied to one or more of the OFDM subchannels.

The PHY mode(s) selected for use in the cell 10 is normally determined as a function of the geographical relationship between the BS and the terminal, the rain region, and the implementation or modem complexity of the terminals. However, the selection of a single PHY mode based on the lowest bit per symbol rate modulation scheme and maximum FEC supported by all terminals may not optimize bandwidth utilization within the cell 10. In particular, better environmental conditions, e.g., less distance, between some terminals (such as units 38, 30 for example) and the BS may permit the use of a less robust PHY mode that has an error level below the maximum desirable error level.

Figure 2:
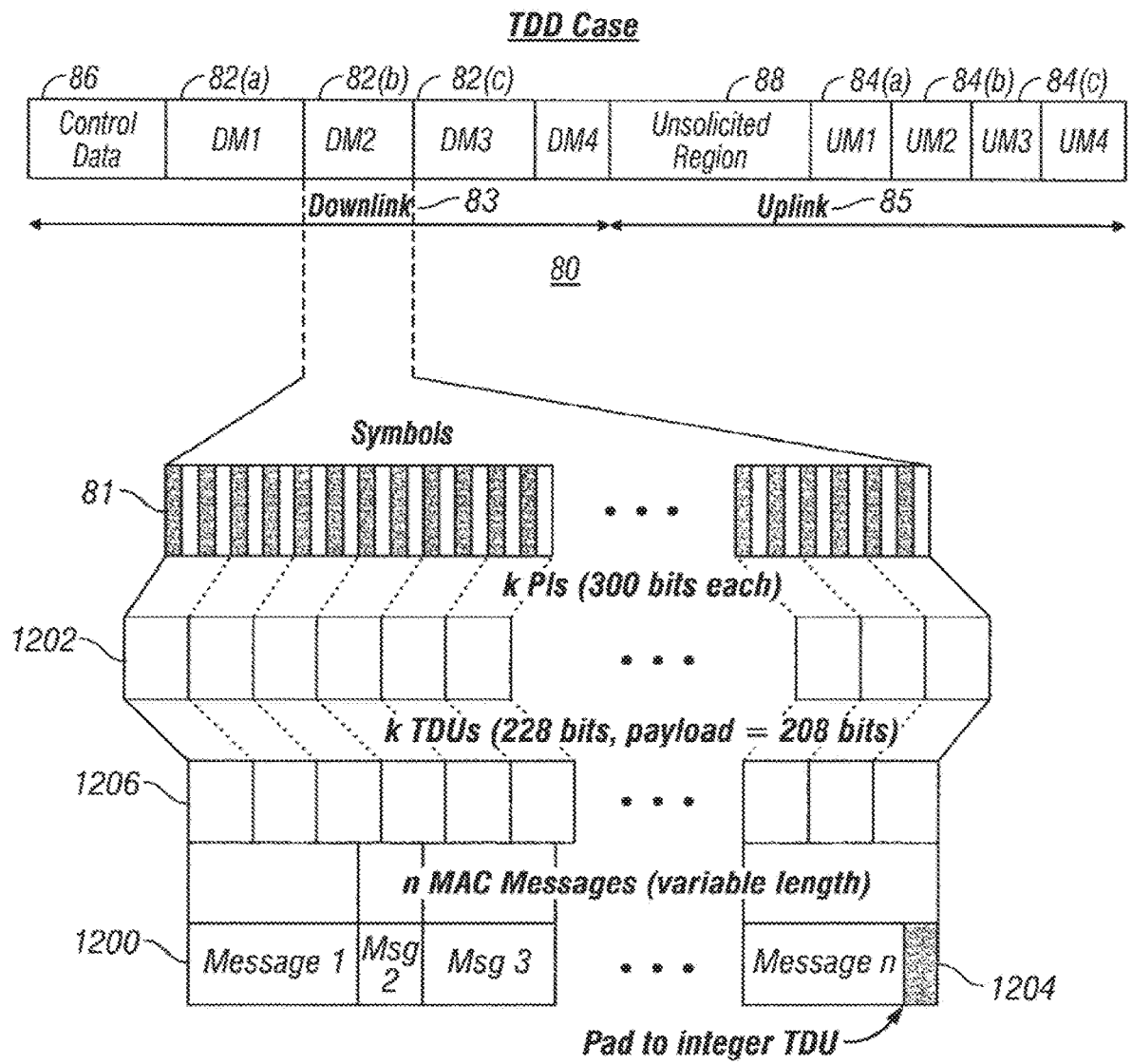
FIG. 2 is a diagram of an exemplary time division duplex ("TDD") frame structure along with an exemplary mapping structure.

FIG. 2 is diagram of an exemplary physical layer frame structure for use in the cell 10 that enables adaptive PHY modes to be employed. FIG. 2 also illustrates a process for mapping data to the physical layer frame structure for transmission to one or more terminals. The PHY mode may be modified from frame to frame or remain constant for a plurality of frames for a particular terminal. Further, a terminal may select or indicate a preferred PHY mode.

Frame 80 includes a plurality of time blocks. The total time duration of the plurality of time blocks in frame 80 can vary. For example, time durations of 0.5 msec, 1 msec, and 2 msec could be used. In this example there are ten time blocks where the first through fifth time blocks are for a downlink subframe 83. The downlink subframe contains downlink data 82(a)-82(n) (from the base station 10 to one or more terminals). The sixth through tenth time blocks form an uplink subframe 85. The uplink subframe contains uplink data 84(a)-84(n) (to the base station 10 from one or more terminals). Data within a single time block is transmitted or received using a single PHY mode.

In this example, each downlink subframe time block has a different PHY mode, e.g. $DM_1$, $DM_2$, $DM_3$, and $DM_4$. The data transmitted using each downlink PHY mode is intended for one or more terminals. The receiving terminal will retrieve data that was transmitted using its preferred PHY mode and/or a more robust PHY mode. Many terminals may be assigned to any one downlink PHY mode where each terminal retrieves its data during the same time block based on an address or identifier. Consequently, a terminal may only retrieve data from a portion of a time block.

Still referring to FIG. 2, the uplink subframe time blocks are associated with PHY modes, e.g. $UM_1$, $UM_2$, $UM_3$, and $UM_4$. Uplink time blocks are assigned to terminals for transmission of data from one or more terminals to the base station. Multiple terminals may be assigned to a single time block based on the terminals preferred PHY mode. For example, terminals 30, 38 could be assigned to $UM_1$. The length of the $UM_1$ will account for the bandwidth requirements of both terminals. In such a case, a transition gap (not shown) may be included between the portions of the uplink subframe time block, $UM_1$, that are assigned to the two terminals. The transition gap can include a preamble for the base station to synchronize with the transmitting terminal. As with the downlink PHY modes, an individual terminal may be assigned more than one uplink PHY mode.

The length, or duration, of each time block can vary. The PHY modes used for the data in each time block can also vary for each downlink and uplink time block between frames. Varying the time duration of the uplink and downlink time blocks, PHY modes, is generally useful, since uplink and downlink data amounts are likely to vary. The TDD frame structure may apply adaptive PHY modes only for the downlink and use a different scheme for the uplink. For example, a fixed modulation scheme could be used for the uplink. Conversely, a different scheme (e.g. fixed modulation) can be used on the downlink, while using adaptive PHY modes on the uplink.

A scheduling approach is used to arrange data from terminals within the frame 80. An uplink scheduling approach may be selected independently from the downlink scheduling approach. The uplink/downlink scheduling approaches may be based on physical layer issues, including interference minimization, propagation delays (including round trip delays), etc., as well as modulation use (specific ordering by PHY mode). Alternatively, the uplink/downlink scheduling approaches may be based completely on data traffic requirements and not on physical layer issues.

One downlink scheduling approach arranges the PHY modes such that DM' (most robust)≤DM$_2$≤DM$_3$≤DM$_4$ (least robust). Thus, the data in the downlink subframe is arranged from the most robust PHY mode to the least robust PHY mode. Each terminal listens to its preferred PHY mode and any PHY modes that are more robust than its preferred PHY mode. The terminals receive all of the data they are capable of receiving, and can keep or discard portions of the data depending on whether the data is intended for them. By using this scheduling approach, each terminal is able to maintain its synchronization with the base station from the start of the downlink subframe, through PHY modes that are more robust than its preferred PHY mode, and finally during its preferred PHY mode.

The uplink scheduling information may be conveyed to the terminals by a map through control data 86. The control data 86 may be located at the start of the downlink subframe 83. The control data 86 can indicate where the PHY mode transitions occur within the frame 80. A typical map is a list of time indicators pointing out transmission location (such as by referencing start and end, or start and length, or offsets relative to a previous transmission). The map can also include terminal identification associating the map entry with a specific terminal. The control data 86 can be encoded using the most robust PHY mode of the system. An exemplary downlink map is discussed below with reference to FIG. 9.

Still referring to FIG. 2, an unsolicited region 88 of the uplink subframe 85 is used by the terminals to communicate control information, such as, bandwidth and registration requests, to the base station. Information placed in the unsolicited region 88 can be encoded using the most robust PHY mode of the system. The unsolicited region 88 can be located at the beginning of the uplink subframe 85.

The downlink subframe 83 transmits the control data 86 along with downlink data 82 intended for one or more terminals. Downlink data symbols 81 are used for transmitting data to the terminals. The symbols may be grouped by the PHY mode, terminal identification, and user ID. For example, symbols 81 are grouped by PHY mode, DM2. Thus, the symbols 81 destined for terminals that are scheduled to receive during DM2 were modulated using the same PHY mode. Once grouped by PHY modes, each time block is transmitted in a pre-defined modulation sequence using a scheduling approach as previously discussed. For example, DM1 is QAM-4, DM2 is QAM-16, DM3 is QAM-64, and DM4 is QAM-256. In any downlink subframe 83, any one or more of the PHY modes may be absent.

The data transmitted during frame 80 is in the form of symbols 81. Communication systems that operate using the LMDS band map Quadrature Amplitude Modulation (QAM) symbols to each time block of frame 80. Alternatively, communication systems that operate using the MMDS band do the same or may map Orthogonal Frequency Division Multiplexing (OFDM) symbols to each time block of frame 80.

FIG. 2 also shows an exemplary downlink mapping of a stream of variable length media access control (MAC) messages 1200 to symbols 81 for transmission during the frame 80. More specifically, the mapping shown in FIG. 2 is used for messages intended for terminals with the same preferred PHY mode, DM2. One or more MAC messages 1200 are fragmented and packed into Transmission Convergence Data Units (TDUs) 1206. Each TDU 1206 includes downlink data 82(*b*) in the form of i bits which may include Transmission Convergence (TC) layer overhead. Each TDU 1206 for a given PHY mode has a fixed length. For example, in FIG. 2, each TDU is comprised of i=228 bits which include 20 bits of TC overhead resulting in the ability to carry 208 bits of MAC message data. Forward error correction (FEC) j bits are added to the i bits of the TDU 1206 to form Physical Information (PI) elements 1202, alternatively called FEC blocks. Each PI element 1202 has a length of k bits (i bits+j bits). The addition of j bits reduces the likelihood of bit errors occurring during demodulation by the terminals. For example, the 228-bit TDUs 1206 can be mapped to 300-bit PIs 1202 by encoding the data in the TDUs 1206. The 228-bit TDU 1206 may be encoded using the well-known Reed-Solomon coding technique to create the 300-bit PI elements 1202. Other minimum quantities of the physical and logical units can be used without departing from the scope of the present invention.

Padding may be added to a MAC message to form an integer multiple of TDUs 1206. For example, FIG. 2 shows padding being added to "message n" so that the result will form an integer multiple of TDUs 1206 and, therefore, an integer multiple of PI elements 1202. The padding can use a fill byte, for example, 0x55. Alternatively, the last PI element 1202 may be shortened, if allowed by the FEC, resulting in a shortened TDU. The process of producing shortened PI elements 1202, a.k.a. FEC blocks, is well-known in the arts.

The PI elements 1202 are then modulated using a modulation scheme to form symbols 81. For example, QAM symbols or OFDM symbols could be used. The number of symbols 81 required to transmit the PI elements 1202 may vary with the PHY mode selected. For example, if QAM-4 is used for DM2, each resulting symbol represents two bits. If QAM-64 is used for DM2, each resulting symbol represents six bits. For convenience, multiple symbols can be further mapped to a physical slot (PS) to decrease the granularity of the data allocation boundaries. For example, a 4-symbol physical slot could be used to decrease the number of bits required to express allocation boundaries in maps.

FIG. 3 is a block diagram of functional elements of an exemplary transmitter 40. The transmitter 40 can include a convolutional encoder 42, a block encoder 44, an M-ary Modulator 46, and an up-converter 49. The transmitter 40 receives i bits of data and encodes the data, packs the encoded bits of data into frame 80 and upconverts the frame of data to a transmission frequency. The convolutional encoder 42 and block coder 44 supply the FEC data that converts the i bits of data into FEC blocks. For example, the convolutional encoder 42 can use a selected ratio to encode i bits of data. The block coder uses the selected code level to encode the convoluted data to produce FEC blocks.

Then, the M-ary QAM modulator converts the FEC blocks into QAM symbols based on the selected bit per symbol rate for each time block. The symbols can then be inserted into the frame 80 using a scheduling technique. Up-converter 49 frequency shifts the packed frame of data to a frequency suitable for transmission between a terminal and base station based on schemes known to those of skill in the art.

FIG. 4 is a block diagram of functional elements of an exemplary receiver 50. The receiver 50 converts the frequency shifted frame of data back into groups of bits of data. The receiver 50 includes a down-converter 59, M-ary QAM demodulator 56, block decoder 54, and convolutional decoder 52. The down-converter 59 frequency shifts the received signal back to baseband using schemes known to those of skill in the art. Block decoder 54 decodes the symbols into FEC blocks using schemes known to those of skill in the art. Then, the convolutional decoder decodes the FEC blocks to produce i bits of data. The methods and frame structures described below are performed by the functional elements of the transmitter and receiver described above with reference to FIGS. 3 and 4.

Figure 5:
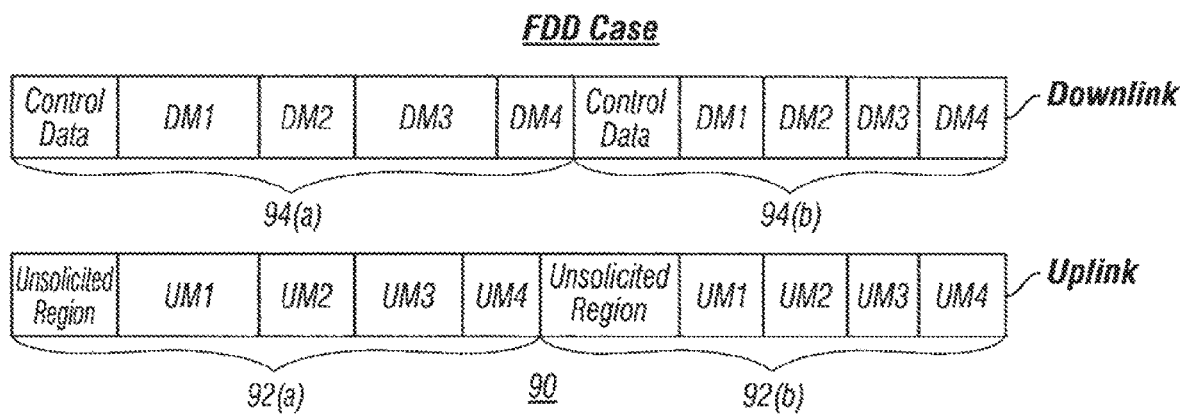
FIG. 5 is the TDD frame structure from FIG. 2 adapted for FDD operation.

Referring now to FIG. 5, a frame structure 90, which has been adapted from frame structure 80 (see FIG. 2), for use in a FDD communication system is shown. The terminals and base station communicate using a series of uplink subframes and a series of downlink subframes. FIG. 5 illustrates two uplink subframes 92(a), 92(b) in a series of uplink subframes and two downlink subframes 94(a), 94(b) in a series of downlink subframes. The downlink subframe is transmitted simultaneously with the uplink subframe on different frequency carriers. This is not possible in the TDD system of FIG. 2. Between the downlink and uplink subframes, the modulation regions may differ in size. This is generally useful, since uplink and downlink data amounts are likely to vary between different terminals. The different modulation densities available to different terminals will affect the transport time they require.

In the FDD frame structure 90, the uplink and the downlink operation may or may not be synchronized. For example, a frame start and a frame end, hence frame length, may be identical, or not, depending on the specific implementation. The FDD frame structure may apply adaptive modulation only for the downlink and use a different scheme for the uplink. For example, a fixed modulation scheme could be used for the uplink. Conversely, a different scheme (e.g. fixed modulation) can be used on the downlink, while using adaptive modulation on the uplink.

Figure 6:
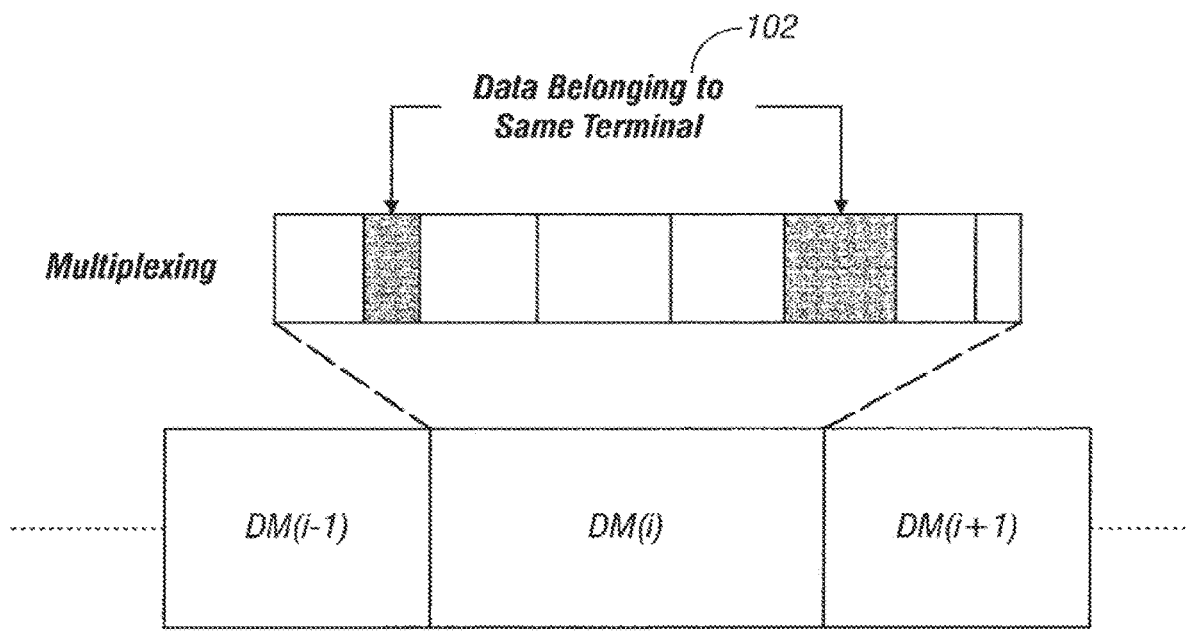
FIG. 6 shows an arrangement for user data from multiple terminals in a TDM time block.

FIG. 6 shows an arrangement for arranging data from multiple terminals into a single Time Division Multiplexing (TDM) time block. Terminals receiving the same modulation (or, more generally, having the same modulation and FEC, i.e. PHY mode) will often be grouped together for downlink transmissions. The data from all terminals using the same PHY mode are multiplexed together. This means that various data packets 102 associated with one terminal could be mixed with data packets of other terminals depending on the exact queuing mechanism which prepared the data for transmission. In this case, while a terminal is receiving a downlink transmission it is required to demodulate all symbols in the time block which uses its assigned modulation. A higher layer addressing mechanism, such as headers, associates the terminal with the data belonging to it.

Figure 7:
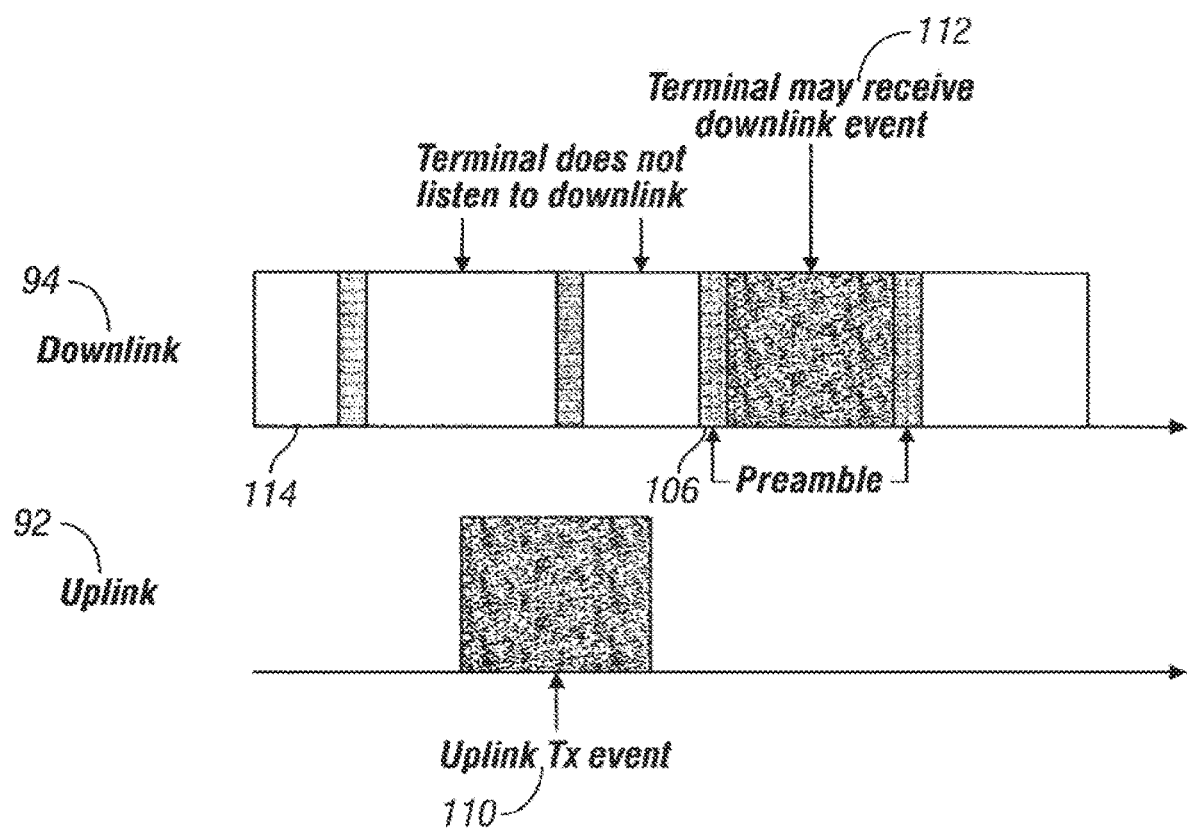
FIG. 7 shows a downlink conflict for a FDD unit restricted to half duplex operation.

FIG. 7 shows a potential downlink conflict for an FDD terminal restricted to half-duplex operation. The half-duplex terminal can represent a terminal 30, 32, 34, 36, 38 (see FIG. 1) operating in an FDD communication system. The half-duplex terminal is unable to simultaneously receive while transmitting. The half-duplex terminal has knowledge of the least robust PHY mode the base station will use to transmit, and will listen to PHY modes which are at least as robust as its preferred PHY mode. However, the half-duplex terminal will be unable to listen to PHY modes that conflict with their scheduled uplink events. Thus, a conflict can occur if the terminal was scheduled to transmit to the base station while receiving from the base station.

To prevent a conflict from occurring, the terminal's uplink transmission (Tx) event 110 is preferably not scheduled at the same time as its downlink event 112. However, the terminal may lose synchronization with the base station during its uplink Tx event 110 and be unable to re-synchronize prior to the base station transmitting its downlink event 112. The loss of synchronization may become more problematic in a communication system that includes multiple terminals restricted to half-duplex operation. For example, in a case where all of the terminals in an FDD communication system operate in a half-duplex fashion, time gaps may occur in a frame during a downlink or uplink. Such time gaps may constitute a significant part of that portion of the frame to which such a terminal's use is restricted.

The downlink subframe structure shown in FIG. 7 alleviates this issue by allowing re-synchronization of half-duplex terminals during the downlink subframe. Specifically, the frame structure of the downlink 94 is Time Division Multiple Access (TDMA). The TDMA structure allocates a portion of the downlink subframe for preambles 106. If a terminal loses synchronization with the base station during the uplink Tx event 110, the preamble 106 allows the terminal to re-synchronize with the base station prior to receiving its downlink.

Each terminal synchronizes and picks up control data 114, including uplink and downlink mapping information, at the beginning of every downlink subframe 94. The uplink map defines when the next uplink Tx event 110 will occur for each terminal in the uplink subframe 92. Similarly, the downlink map is used by terminals to determine when downlink events 112 will occur in the downlink subframe 94. For example, a downlink map entry can indicate when the downlink subframe will transmit data with a specific PHY mode.

Uplink and downlink events can contain data associated with more than one user of the terminal. Higher layer addressing may be applied to determine specific associations of user data. The downlink map entry is not required to contain terminal identification information. Instead, a terminal which ended its uplink transmission and is available for downlink reception can use the downlink map to determine the next event which is relevant for it, that is, the next event that uses its preferred PHY mode, i.e. modulation parameters and FEC, which correspond to its settings. This mapping information will be further explained with reference to FIG. 9. The downlink event 112 for a terminal is preceded by a preamble 106 in the downlink subframe 94. The preamble allows the terminal to quickly re-synchronize prior to demodulating the data in the downlink event 112. When the downlink event 112 ends (meaning that demodulation process of the associated data terminates), the terminal is ready for the next uplink Tx event as defined in the uplink map.

Figure 8:
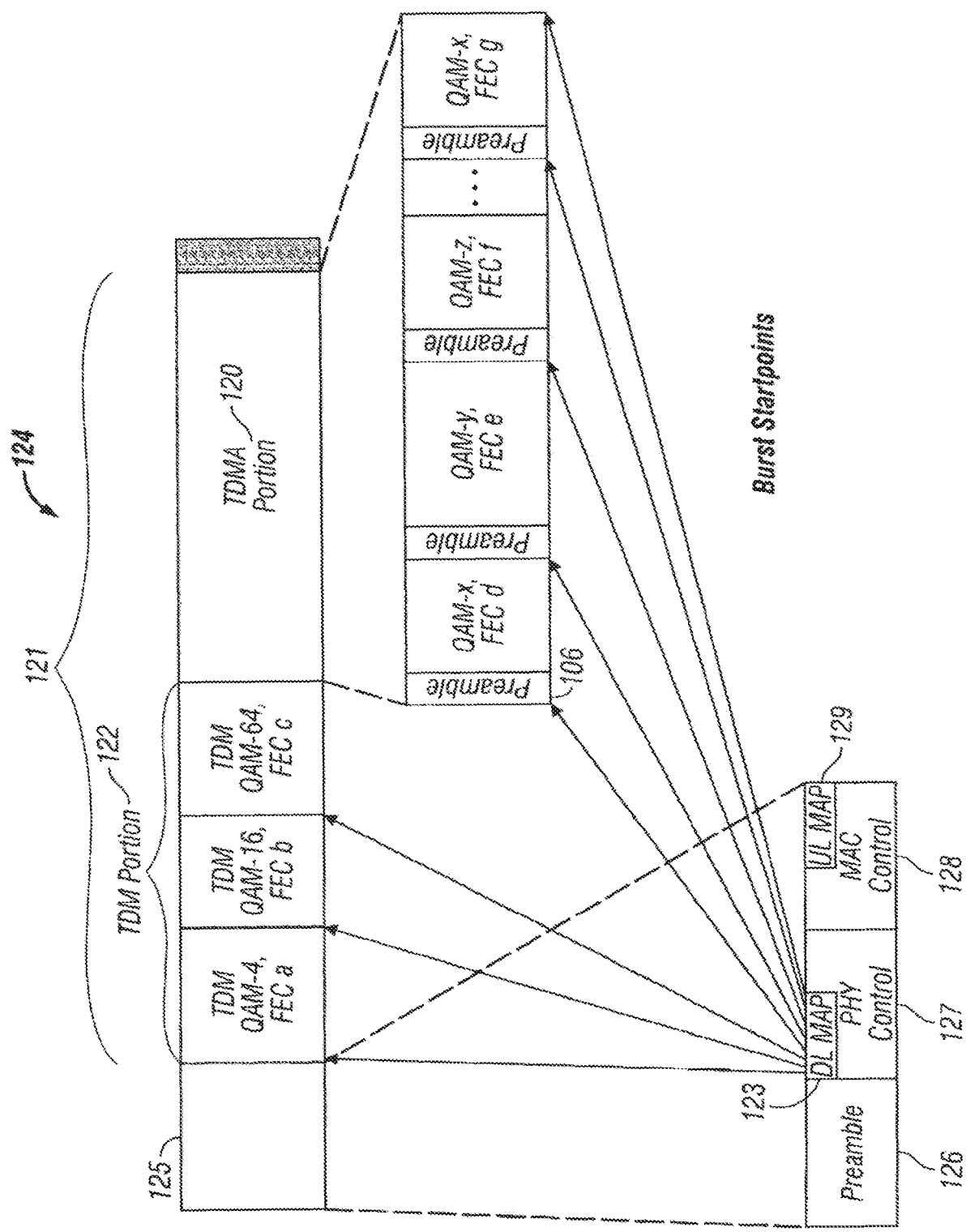
FIG. 8 is a mapping diagram for a combined FDD TDM/TDMA downlink subframe.

FIG. 8 is a mapping diagram for a combined FDD TDM/TDMA downlink subframe for use with half-duplex and full-duplex terminals. When an FDD communication system includes differing terminal types, i.e. half-duplex and full-duplex, additional scheduling difficulties may occur. The frame structure shown in FIG. 8 alleviates these issues by combining TDMA and TDM in a single downlink subframe 124. The TDM is utilized for bandwidth efficiency and the TDMA is used for half-duplex terminal support as will be explained below. In an FDD communication system having only full-duplex terminals, there is no need to use the TDMA portion. The same is true for any individual frame in which only full-duplex terminals are scheduled to transmit in the uplink. Conversely, in a typical TDD communication system only the TDM portion needs be used even if the communication system includes half-duplex terminals. However, the use of the TDMA portion in a TDD communication system allows the base station to utilize a smart antenna for downlinks. In such a TDD system, each terminal can re-synchronize with the base station during the downlink subframe.

Each downlink subframe 124 can include a frame control header 125 and downlink data 121. The frame control header 125 can include a preamble 126, PHY control information 127, and media access control (MAC) information 128. The preamble 126 is used for synchronizing the terminals with the base station. For example, preamble 126 allows the terminals to synchronize with the base station at the beginning of the downlink subframe 124. The preamble can be transmitted using a robust PHY mode. A robust PHY mode allows terminals that are configured for receiving only robust modulation schemes to demodulate the preamble and synchronize with the base station.

The PHY control information 127 can include a downlink map 123. The downlink map 123 indicates to the terminals where and what modulation changes occur in the downlink data 121. An exemplary downlink map 123 is discussed below with reference to FIG. 9.

The MAC control information 128 provides terminals with instructions on transmission protocols for the uplink subframe. These instructions can include an uplink map 129. The uplink map 129 is a map of a subsequent uplink subframe that is to be transmitted by the terminals.

To minimize errors in the mapping process, the base station transmits the downlink map and the uplink map using a robust PHY mode. Moreover, the base station can allocate a minimum number of symbols for the TDM portion 122 to accommodate the time required for the terminals to process and act upon the first downlink map entry. The downlink map 123 is the first information broadcast to the terminals in a downlink subframe to maximize the amount of time between receiving the downlink map and when the first terminal is required to act based on the downlink map. All other control information 125, including the uplink map 129, can come after the broadcast of the downlink map 123.

A full-duplex terminal, and any half-duplex terminal that receives later than it transmits within a frame, can take advantage of the TDM portion 122 of the downlink subframe 121. Thus, the downlink data 124 starts with a TDM portion 122. Additionally, to increase statistical multiplexing gain, it should be noted that full-duplex terminals are also able to re-synchronize with the base station in the TDMA portion 120 to receive data. Accordingly, the downlink subframe 124 is constructed with a TDM portion 122 followed by a TDMA portion 120. The downlink map 123 for a pure TDMA downlink subframe would have the same number of map entries as the TDM/TDMA downlink subframe of FIG. 8. However, differences include the presence or absence of preambles 106 in the TDMA portion 120, and the desirability of ordering the TDM portion 122 by PHY mode robustness.

Figure 9:
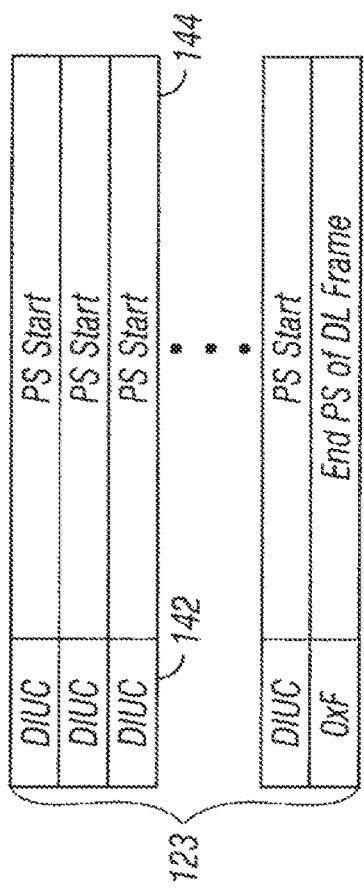
FIG. 9 shows an exemplary downlink map structure.

FIG. 9 shows the structure of an exemplary downlink map 123 from FIG. 8 for use with a TDM/TDMA frame structure. The downlink map 123 allows the terminals to recognize PHY mode transitions in the downlink. The exemplary downlink map 123 can be any sequence of time indicators pointing out transmission location (such as by referencing start and end, or start and length, or offsets relative to a previous transmission) and terminal identification associating the map entry with a specific terminal. The time location information can be stated as a number of symbols referenced to frame start, or as any pre-defined unit of time understandable by the terminal. For example, if there are four modulation regions then four map entries are expected. If the map elements are using modulation symbols as time ticks, then a map containing "0123", "0234", "1119", and "2123" is interpreted as DM1 starting on symbol 123, DM2 starting on symbol 234, DM3 starting on symbol 1119, and DM4 starting at symbol 2123.

The exemplary downlink map 123 of FIG. 9 can include a sequence of 20 bit entries. In this example, four bits can contain a Downlink Interval Usage Code (DIUC) entry 142. The DIUC defines the downlink PHY mode for each PHY mode in the downlink data 121 (see FIG. 8). The DIUC can indicate the PHY mode (i.e. modulation, FEC) and also whether the PHY mode is preceded by a preamble (TDMA) or not (TDM). For example, if a base station had five downlink PHY modes to select from for its downlink transmissions, the base station would require ten unique DIUCs to identify the possible combinations. Thus, the DIUCs could describe the transition points between PHY modes in the TDM portion 122 as well as for each PHY mode in the TDMA portion 120. For example, the downlink map 123 may include entries for a begin TDM portion, a TDM transition to Q16, a TDM transition to Q64, an end of TDM portion, and an end of TDMA portion. Some formats have flexibility in terms of channel bandwidth and frame length. In these cases, the PS start field 144 may be used to represent physical slots rather than symbols, giving lower granularity of downlink allocation.

Figure 10:
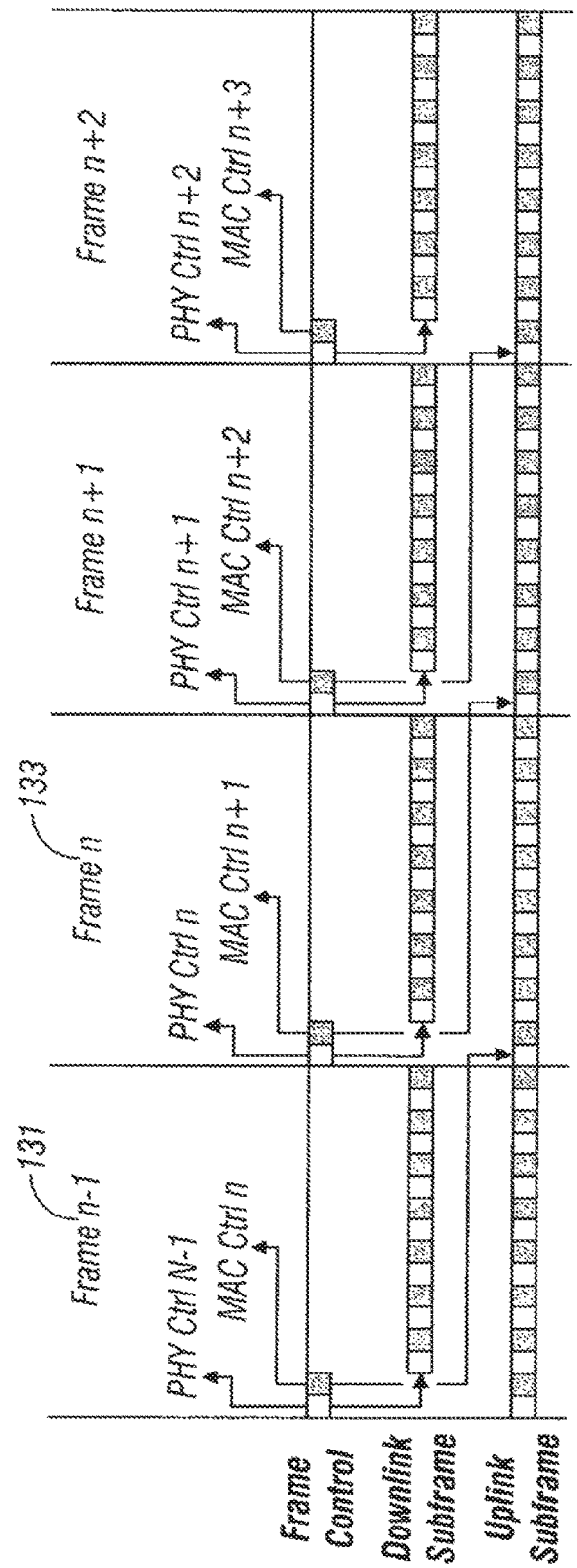
FIG. 10 shows an exemplary relationship between frame mapping data and the data it maps for a FDD communication system.

FIG. 10 shows one relationship between frame mapping data and the data it maps for an FDD communication system. The downlink map 123 (see FIG. 8) is valid for the frame in which it appears. For example, the downlink map in PHY Ctrl n−1 is valid for frame n−1 131. Similarly, the downlink map in PHY Ctrl n is valid for frame n 133. The uplink map 129 (see FIG. 8) can be valid for the next uplink subframe as shown in FIG. 10. The uplink subframe in FIG. 10 is shown synchronized with the downlink subframe. However, the start of the downlink subframe and the start of the uplink subframe do not have to be synchronized. In this case, the uplink map 129 in frame n−1 131 can be valid for an uplink subframe that begins during frame n−1 131.

Figure 11:
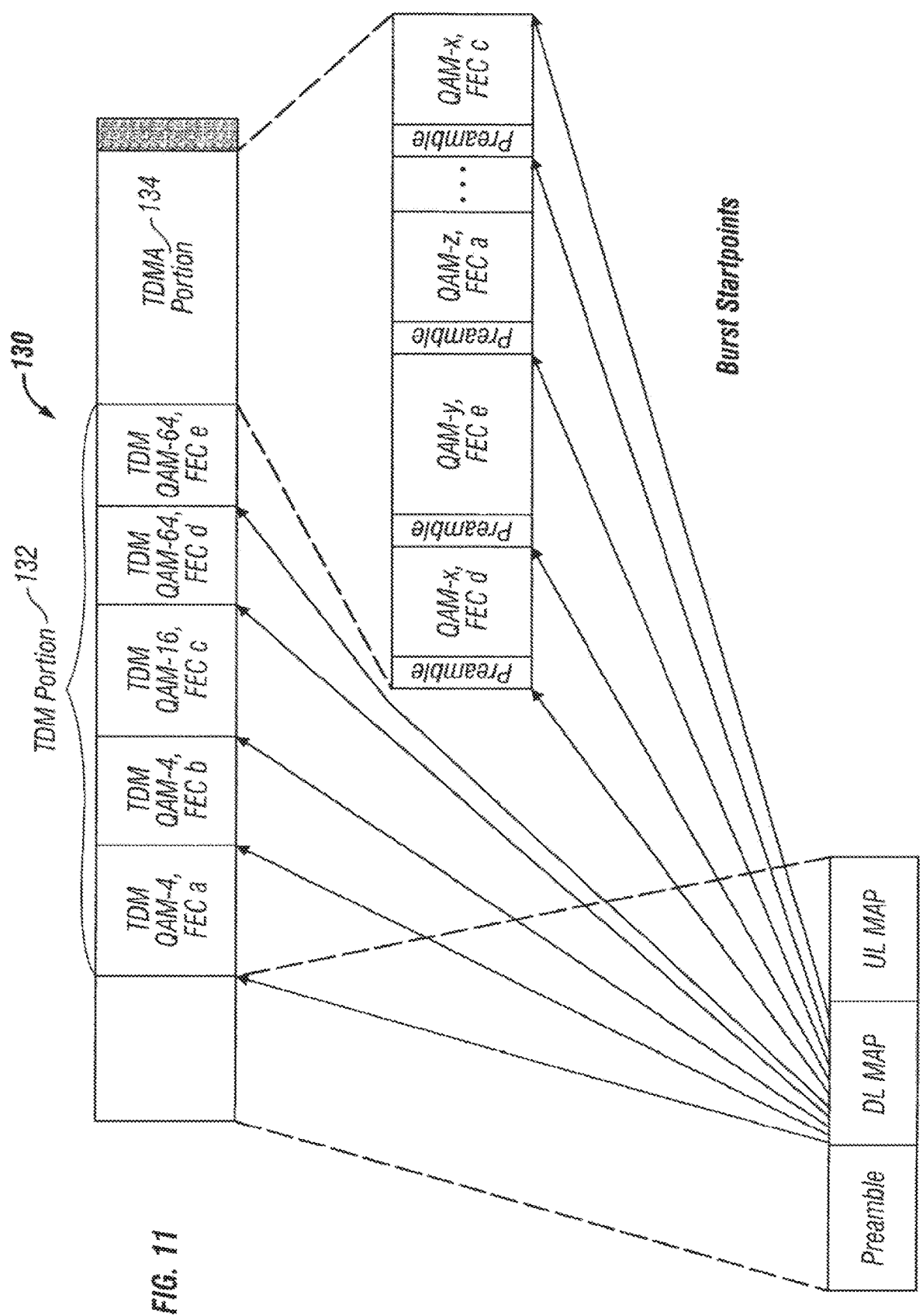
FIG. 11 is a mapping diagram for an FDD TDM/TDMA downlink subframe which varies PHY modes based on modulation and FEC.

FIG. 11 is a mapping diagram for a FDD TDM/TDMA downlink subframe that varies FEC types for a given modulation scheme. The downlink subframe 130 is the same as described with respect to FIG. 8 except that a TDM portion 132 and a TDMA portion 134 both use a plurality of different FEC types in combination with different modulation types. For example, QAM-4 is used with FEC a in the TDM portion 132. FEC a is the most robust FEC and is used for weak channels. Slightly stronger channels may use QAM-4 with a somewhat less robust FEC b in the TDM portion. A less forgiving modulation, such as QAM-64, may be used with different levels of FEC, such as FEC d and FEC e, in the TDM portion 132. The TDMA portion 134 may also be defined by modulation type in combination with FEC type. For example, QAM-x is used with both FEC d and FEC c in the TDMA portion 134 of the downlink subframe 130.

Figure 12:
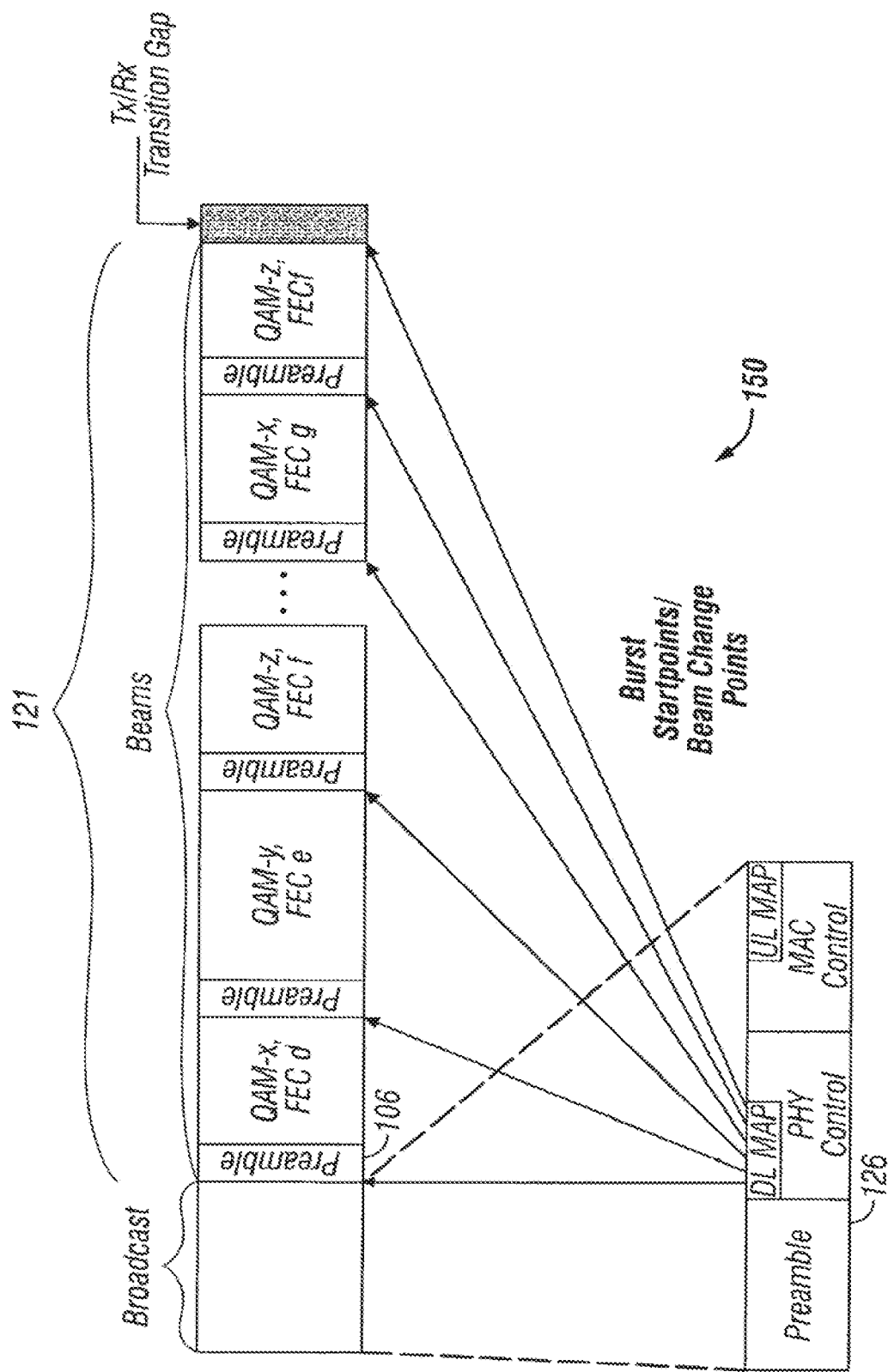
FIG. 12 is a mapping diagram for a TDD TDM/TDMA downlink subframe that supports smart antennae.

FIG. 12 is a mapping diagram for a TDM/TDMA downlink subframe that supports smart antennae. The downlink subframe 150 is the same as described with respect to FIG. 8 except that the TDMA portion is used for all of the downlink data 121. While not recommended for efficiency, a downlink could be scheduled to be entirely TDMA. In practice, the TDMA portion need only be used in the presence of half-duplex terminals in a FDD communication system, and then only when the half-duplex terminals cannot be scheduled to receive earlier in the frame than they transmit. However, by extending the TDMA resynchronization capability to the entire downlink data 121 the base station could use smart antenna for its transmissions. This would allow the base station 20 to transmit to an individual terminal or a group of terminals within cell 10. Each individual terminal or group of terminals would be able to re-synchronize with the base station 20 at the beginning of their burst.

Full-duplex terminals and half-duplex terminals that receive before they transmit could both use TDMA. The order of the PHY modes within the downlink subframe 150 could be varied. Each terminal would still receive a broadcast preamble 126 from the base station which would indicate when their preamble 106 would be transmitted by the base station. The use of a smart antenna would increase the gain of the received signal at the terminal. However, some bandwidth would be lost due to the addition of preambles and map entries.

A TDD communication system could also use the design of the TDMA downlink subframe 150 to incorporate a base station smart antenna. In the TDD communication system, only one channel is used for uplinks and downlinks. The terminals do not lose synchronization between the broadcast preamble 126 and the transmission of their data. Thus, if the PHY modes are ordered in the downlink and broadcast to an entire cell without a smart antenna, the terminals are able to maintain their synchronization. By incorporating a smart antenna at the base station, the terminals within the cell will lose synchronization. However, the use of a TDMA downlink subframe 150 and its preambles 106 as described above would allow the terminals to resynchronize with the base station prior to receiving their data.

When building an FDD communication system, full-duplex terminals are more efficiently served by a TDM downlink. Half-duplex terminals, however, are better served by a TDMA downlink. However, in communication systems where both full and half-duplex terminals exist, scheduling the downlink and uplink transmission opportunities for the half-duplex terminals is non-trivial, since these terminals cannot transmit and receive simultaneously. Some half-duplex terminals may be scheduled to receive before they transmit. In this case, the base station can transmit downlink data to such half-duplex terminals in the TDM portion, since these terminals get synchronization from the preamble at the beginning of the downlink subframe. However, some half-duplex terminals are unable to be scheduled to transmit after they receive their data. Such terminals would lose the synchronization as they transmit, because they complete the transmission in the middle of the downlink subframe and hence have no preamble to use to synchronize their receiver to the base station.

One solution is to schedule the downlink data transmissions of these half-duplex terminals in a TDMA portion. This allows the terminals to receive the preamble at the beginning of the TDMA burst for receiver synchronization. Although this approach resolves the problem of half-duplex terminal receiver synchronization, each burst in the TDMA portion requires a DIUC message. The number of DIUC or map entries may grow if the number of TDMA bursts increases, wasting bandwidth for actual data transmission. Furthermore uplink maps are typically built only one frame ahead of time. Therefore, it is not possible to know the size of the downlink data for those half-duplex terminals in order to properly schedule the downlink data reception before transmission.

Scheduling Algorithm

A scheduling algorithm will now be described to allow TDM and TDMA portions of a downlink to co-exist in the same downlink subframe. The algorithm allows maximum flexibility and efficiency for FDD communication systems that must simultaneously support full and half-duplex terminals. The algorithm further allows the TDM of multiple terminals in a TDMA burst to minimize the number of map entries in a downlink map. The algorithm limits the number of downlink map entries to (2×n)+1, where n is the number of PHY modes. The algorithm works for pure TDMA downlinks (see FIG. 12), and for downlinks where TDM and TDMA co-exist (see FIGS. 8 and 11). The scheduling algorithm is intended to be used in communication systems which allocate the uplink subframe ahead of building the downlink subframe.

Algorithm Description

First, all terminals are grouped together by the modulation/FEC (PHY mode) in which they receive downlink data. The number of groups formed will be equal to the number of PHY modes being used for downlink in the communication system. Uplink bandwidth is allocated to the terminals such that the uplink transmission opportunities of terminals belonging to the same group are kept contiguous in time.

Within these groupings, the uplink bandwidth allocated to an individual terminal is contiguous in time. The groups themselves can be ordered in a particular order to maximize the TDM portion of the downlink. To avoid the problem of scheduling the downlink and uplink transmission simultaneously in time for the terminals within the same group, the downlink data of the first group is scheduled first to overlap with the uplink bandwidth of the next group to be allocated. This proceeds until all the downlink data has been allocated.

Notations Used in the Scheduling Algorithm n: the number of downlink (DL) PHY modes (e.g. FEC-type/Modulation combinations) used by system.

$S_n$: set of DL PHY modes, where PHY mode j, is more robust (comes earlier in the downlink TDM section) than DL PHY mode j+1, j∈$S_n$.

$U_j$: total amount of uplink bandwidth, in symbols (or in time, in an asymmetric FDD system), allocated for all terminals that receive downlink data using DL PHY mode j, where j∈$S_n$.

$D_j$: total amount of downlink bandwidth, in symbols (or in time, in an asymmetric FDD system), allocated for all terminals that receive downlink data using DL PHY mode j, where j∈$S_n$.

T: total amount of bandwidth, in symbols (or in time, in an asymmetric FDD system), available on the downlink channel.

$u_k$: total amount of uplink bandwidth, in symbols (or in time, in an asymmetric FDD system), allocated for an individual terminal, k.

$d_k$: total amount of downlink bandwidth, in symbols (or in time, in an asymmetric FDD system), allocated for an individual terminal, k.

System Constraints

The worst case scheduling is the case where all terminals are half-duplex.

For a half duplex terminal k, $d_k+u_k \leq T$.

There can only be one j, such that $D_j+U_j \geq T$.

Worst case is when $$\sum_{j \in S_n} (D_j + U_j) = 2T$$

The link is full, both uplink and downlink).

The following description is shown for the case when n=5. Those skilled in the art will understand that the algorithm may readily be extended to any value of n.

Figure 13:
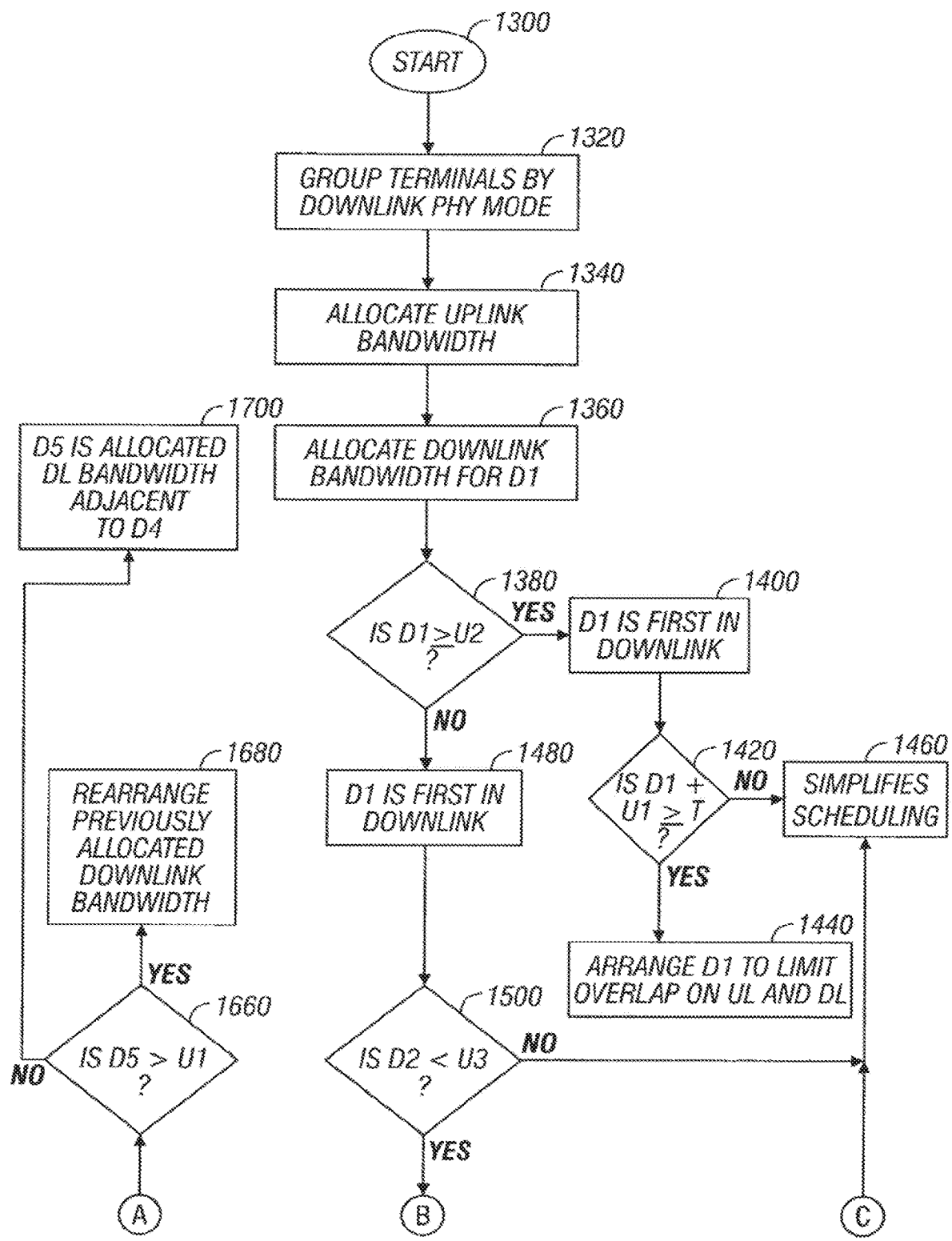
FIG. 13 is a flow chart for a scheduling algorithm.
Figure 13:
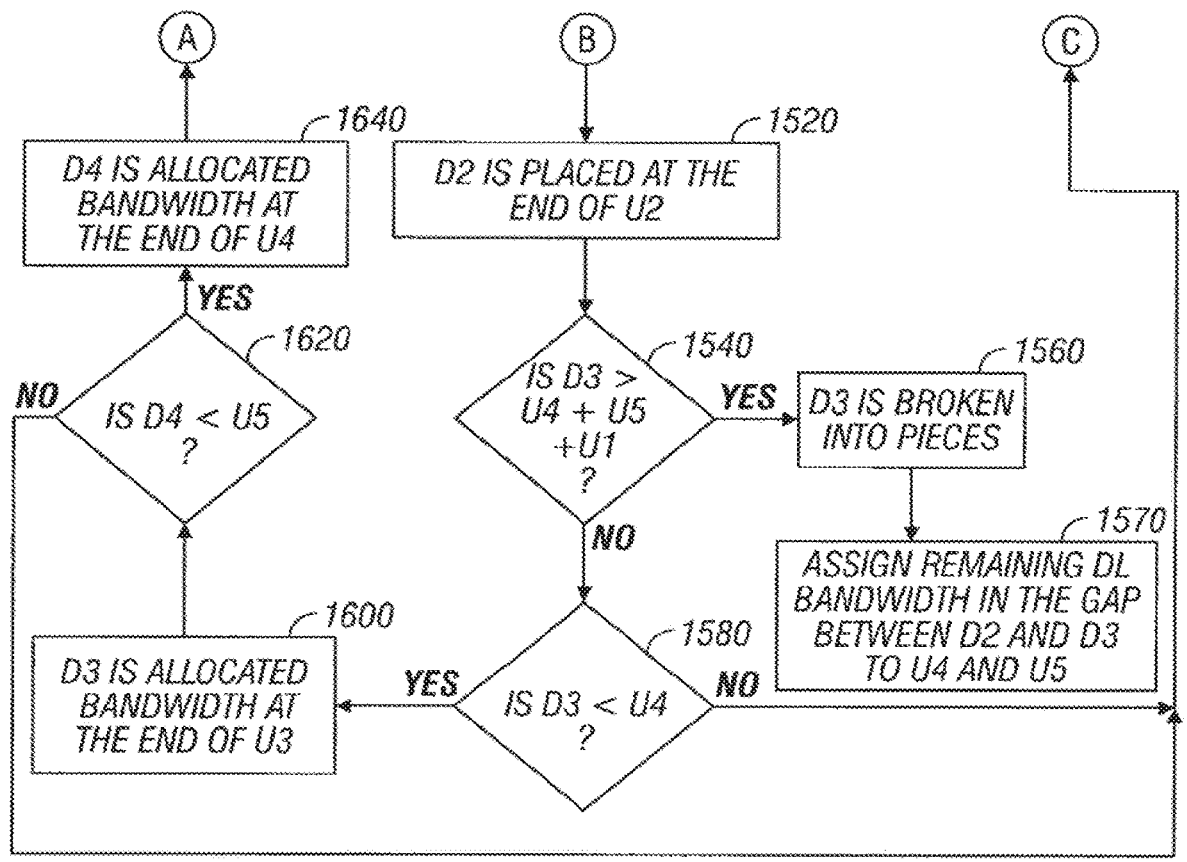

FIG. 13 is a flow chart for a scheduling algorithm. The scheduling algorithm process begins at a start state 1300. Next at a state 1320, all of the terminals are grouped by their downlink PHY modes. Flow proceeds to a state 1340 where uplink bandwidth is allocated for the terminals. The uplink bandwidth transmission opportunities are contiguous for terminals with the same downlink PHY mode. The total uplink bandwidth allocated for group j is $U_1$, where $j \in S_n$. Flow moves to a state 1360 where the groups are ordered in the downlink subframe. The uplink groups, $U_1$, are put in order of the robustness of their PHY modes, starting with the second most robust downlink (j=2) and continuing in order of decreasing robustness. The terminal group with the most robust DL PHY mode, Un, last. This is shown in FIG. 14.

Flow continues to a state 1360 where the terminal group identified as $D_1$, j=1, is allocated downlink bandwidth at the start of the downlink subframe. Next, at a decision state 1380, the process determines whether $D_1 \geq U_2$. If $D_1 \geq U_2$ then flow continues to a state 1400 were the scheduling algorithm allocates downlink bandwidth for $D_1$ at the start of the downlink subframe. This is shown in FIG. 15.

Flow continues to a decision block 1420 to determine whether $D_1+U_1 \geq T$. If $D_1+U_1 \geq T$, the process continues to a state 1440 where $D_1$ is arranged such that an individual terminal's bandwidth does not overlap on the uplink and downlink, even while guaranteeing that the downlink map will not exceed 2n+1. In this case there must be more than one terminal represented by $D_1$.

Returning to decision block 1420, if $D_1+U_1 \geq T$ is not true, then the process continues to a state 1460 where the downlink scheduling becomes easier since $U_2$ will not be transmitting while receiving. Subsequent allocations of downlink bandwidth are placed adjacent to the prior allocations. For example, $D_2$ is placed next to $D_1$ in FIG. 15.

Returning to decision block 1380, if $D_1<U_2$, then the process moves to a state 1480 where the scheduling algorithm allocates downlink bandwidth for $D_1$ at the start of the downlink subframe. This is shown in FIG. 16.

Flow continues to a decision block 1500 where a determination is made whether $D_2<U_3$. If $D_2<U_3$ is not true, flow continues to state 1460 where the downlink scheduling becomes easier since $U_3$ will not be transmitting while receiving. Subsequent allocations of downlink bandwidth are placed adjacent to the prior allocations. For example, $D_3$ is placed next to $D_2$.

Returning to decision block 1500, if $D_2<U_3$, flow continues to a state 1520 where the scheduling algorithm allocates downlink bandwidth for $D_2$ at the end of the uplink bandwidth that was allocated for $U_2$. In this case, once the half-duplex terminal assigned to $U_2$ finishes its uplink transmission, it will begin receiving its downlink transmission during $D_2$ from the base station. A gap in the downlink subframe is left between D1 and D2. This is shown in FIG. 17. If $D_2$ had been allocated downlink bandwidth adjacent to $D_1$, a terminal assigned to $D_2/U_2$ would have possibly had a conflict. Note that in an event that $D_2$ overlaps with $U_2$, terminals can be arranged such that no terminal in this group has uplink and downlink bandwidth overlap.

Next, at decision block 1540, a determination is made whether $D_3>U_4+U_5+U_1$. If $D_3>U_4+U_5+U_1$ is true, the process continues to a state 1560 where $D_3$ is broken into multiple pieces. The pieces are then inserted in the remaining gaps in the downlink subframe. This is shown in FIG. 18. Note that if $D_3$ overlaps with $U_3$, terminals assigned to $D_3$ can be arranged such that no terminal in this group has uplink and downlink bandwidth overlap. The process continues to a state 1570 where the remaining downlink bandwidth, located between $D_2$ and $D_3$, is allocated for downlink transmissions by terminals assigned to $D_4$ and $D_5$.

Returning to decision block 1540, if a determination is made that $D_3>U_4+U_5+U_1$ is not true, flow continues to decision block 1580 where a determination is made as to whether $D_3<U_4$. If $D_3<U_4$ is not true, the process returns to state 1460 where the downlink scheduling becomes easier since $U_4$ will not be transmitting while receiving.

Returning to decision block 1580, if $D_3<U_4$, the process moves to a state 1600 where $D_3$ is allocated a portion of the downlink subframe beginning from the end of $U_3$. A gap in the downlink subframe is left between $D_2$ and $D_3$. This is shown in FIG. 19.

Next at decision block 1620, a determination is made whether $D_4<U_5$. If $D_4<U_5$ is not true, the process returns to state 1460 where the scheduling is easier. $D_4$ is placed at the end of its assigned uplink $U_4$, so that $D_4$ will downlink once it finishes receiving its uplink, $U_4$. Subsequent allocations of downlink bandwidth are placed adjacent to the prior allocations. For example, $D_5$ is placed next to $D_4$.

Figure 21:
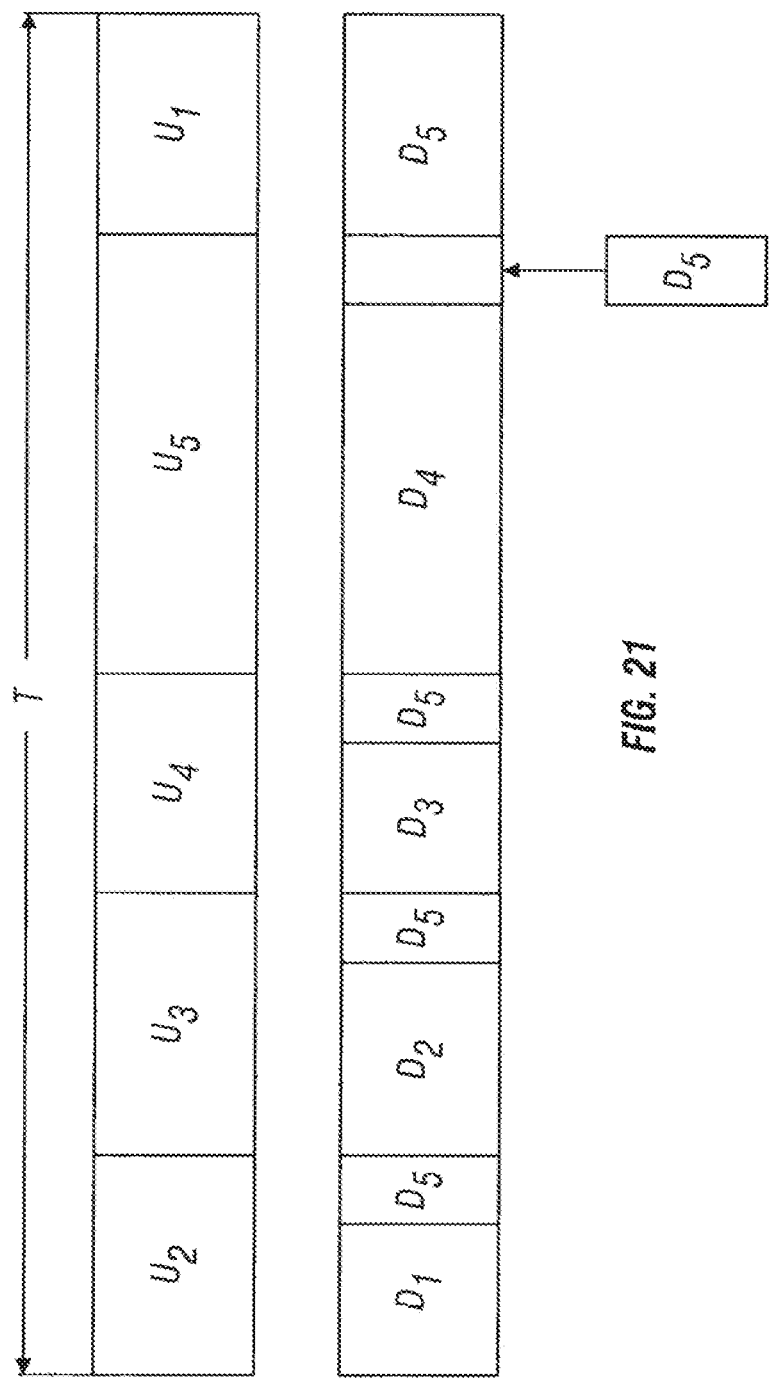
FIG. 21 represents a scheduling of downlink PHY mode $D_5$ within the downlink subframe that results in PHY mode $D_5$ having to transmit while it receives.

Returning to decision block 1620, if $D_4<U_5$, the process continues to a state 1640 where $D_4$ is placed at the end of $U_4$. This is shown in FIG. 20. Next, at a decision state 1660, the algorithm determines whether the last downlink segment $D_5$ is longer in duration than $U_1$ and all remaining fragments excluding any fragment that is aligned with $U_5$. If the algorithm determines downlink segment $D_5$ is longer in duration than $U_1$ and all remaining fragments excluding any fragment that is in aligned with $U_5$ (as shown in FIG. 21), the process continues to a state 1680 where bandwidth rearrangement is performed. There will be other downlink bandwidth allocations that can be moved in line with $U_5$ to make room for the remainder of $D_5$. The final rearrangement of downlink scheduling is shown in FIG. 22.

Returning to decision block 1660, if the last downlink segment $D_5$ is shorter in duration than $U_1$ and all remaining fragments excluding any fragment that is aligned with $U_5$, then the process moves to a state 1700 where $D_5$ is placed at the end of $D_4$ and interleaved in the gaps in the downlink subframe. No subsequent rearrangement is required. The foregoing algorithm ensures that the number of map entries will not exceed 2n+1. However, after employing the algorithm, under many circumstances further rearrangement of the downlink will be possible to further reduce the number of downlink map elements below 2n.

While the above detailed description has shown, described, and pointed out novel features as applied to various embodiments, it will be understood that various omissions, substitutions, and changes in the form and details of the device or process illustrated may be made by those skilled in the art without departing from the spirit. The scope is indicated by the appended claims rather than by the foregoing description. All changes which come within the meaning and range of equivalency of the claims are to be embraced within their scope.

The invention claimed is:
1. A method of communication between a base station and a plurality of cellular telephones, comprising:
grouping the plurality of cellular telephones into groups by the downlink (DL) physical (PHY) mode in which they will receive DL data;
encoding, at the base station, for cellular telephones scheduled to receive DL data in a DL frame and for cellular telephones scheduled to transmit data in an uplink (UL) frame using a PHY mode compatible with cellular telephones scheduled to receive DL data in a

DL frame and for cellular telephones scheduled to transmit data in an uplink (UL) frame:
  synchronization information,
  information about DL transmission resources allocated to the cellular telephones scheduled to receive DL data in the DL frame, including what portion of the DL transmission resources allocated to the cellular telephones is allocated for each of the cellular telephones scheduled to receive DL data in the DL frame, a DL transmission resource being associated with a DL PHY mode,
  information about UL transmission resources allocated to cellular telephones scheduled to transmit data in the UL frame, including what portion of the UL transmission resources allocated to the cellular telephones is allocated for each of the cellular telephones scheduled to transmit UL data in the UL frame, an UL transmission resource being associated with an UL PHY mode, wherein the UL transmission resources are allocated to the cellular telephones such that the UL transmission resources allocated to cellular telephones belonging to the same group are kept contiguous in time, and
  encoding the DL data using the associated DL PHY mode in the DL frame;
transmitting, from the base station, the DL frame, the encoded synchronization information, the encoded information about DL transmission resources and the encoded information about UL transmission resources, to the plurality of cellular telephones; and
receiving, at the base station, from at least one cellular telephone, UL data in the UL transmission resource of the UL frame according to the UL PHY mode.

2. A method as claimed in claim 1, wherein the base station is operable to update the UL PHY mode and the DL PHY mode based on data traffic requirements and physical layer requirements of the wireless communication system.

3. A method as claimed in claim 2, wherein the physical layer requirements include one or more of interference minimization, propagation delays and round trip delays.

4. A method as claimed in claim 1, wherein the DL PHY mode provides information about a DL modulation scheme and a DL coding scheme to be used by the cellular telephones scheduled to receive DL data in the DL frame for decoding the DL data.

5. A method as claimed in claim 1, wherein the UL PHY mode provides information about an UL modulation scheme and an UL coding scheme to be used by the cellular telephones scheduled to transmit data in the UL frame for encoding the UL data.

6. A wireless system comprising:
a base station comprising
  a transmitter and
  a receiver,
the base station enabled to,
group a plurality of cellular telephones into groups by the downlink (DL) physical (PHY) mode in which they will receive DL data,
encode, for cellular telephones scheduled to receive DL data in a DL frame and for cellular telephones scheduled to transmit data in an uplink (UL) frame:
  synchronization information,
  information about DL transmission resources allocated to the cellular telephones scheduled to receive DL data in the DL frame, including what portion of the DL transmission resources allocated to the cellular telephones is allocated for each of the cellular telephones scheduled to receive DL data in the DL frame, a DL transmission resource being associated with a DL PHY mode,
  information about UL transmission resources allocated to cellular telephones scheduled to transmit data in the UL frame, including what portion of the UL transmission resources allocated to the cellular telephones is allocated for each of the cellular telephones scheduled to transmit UL data in the UL frame, an UL transmission resource being associated with an UL PHY mode, wherein the UL transmission resources are allocated to the cellular telephones such that the UL transmission resources allocated to cellular telephones belonging to the same group are kept contiguous in time, and
  the DL data using the associated DL PHY mode in the DL frame including
    packing and fragmenting variable length MAC messages based on the information about the DL transmission resource allocated to the cellular telephone in the DL frame and error encoding and
    modulating the MAC messages based on the DL PHY mode provided by the information about the DL transmission resource allocated to the cellular telephone in the DL frame,
transmit the DL frame, the encoded synchronization information, the encoded information about DL transmission resources and the encoded information about UL transmission resources, to the plurality of cellular telephones, and
receive, from at least one cellular telephone, UL data in the UL transmission resource of the UL frame according to the UL PHY mode.

7. A system as in claim 6, wherein the DL PHY mode is updated based on the quality of the downlink.

8. A system as in claim 6, wherein the UL PHY mode is updated based on the quality of the uplink.

9. A system as claimed in claim 6, wherein the DL PHY mode provides information about a DL modulation scheme and a DL coding scheme to be used by the cellular telephone for encoding the DL data.

10. A system as claimed in claim 6, wherein the UL PHY mode provides information about an UL modulation scheme and an UL coding scheme to be used by the cellular telephone for encoding the UL data.

* * * * *